United States Patent [19]

Nanba

[11] Patent Number: 5,541,644
[45] Date of Patent: Jul. 30, 1996

[54] IMAGE REPRODUCING APPARATUS

[75] Inventor: Katsuyuki Nanba, Osakasayama, Japan

[73] Assignee: Minolta Camera Kabushiki Kaisha, Osaka, Japan

[21] Appl. No.: 179,034

[22] Filed: Jan. 6, 1994

[30] Foreign Application Priority Data

| Jan. 11, 1993 | [JP] | Japan | 5-002661 |
| Jan. 11, 1993 | [JP] | Japan | 5-002727 |
| Jan. 11, 1993 | [JP] | Japan | 5-002748 |

[51] Int. Cl.$^6$ ................................... H04N 7/18
[52] U.S. Cl. .................. 348/96; 360/3; 360/101; 369/14
[58] Field of Search ................ 358/335; 348/96; 360/3, 101, 60, 80; 369/14; H04N 7/18

[56] References Cited

U.S. PATENT DOCUMENTS

| 4,040,108 | 8/1977 | Nakata | 360/101 |
| 4,482,924 | 11/1984 | Brownstein | 358/302 |
| 4,974,096 | 11/1990 | Wash | 348/96 |
| 5,384,664 | 1/1995 | Koehler | 360/3 |

Primary Examiner—Howard W. Britton
Attorney, Agent, or Firm—Burns, Doane, Swecker & Mathis, L.L.P.

[57] ABSTRACT

An image reproducing apparatus for reproducing an image recorded on successive frames of a film having a storage medium which information for each frame is readable from and writable on, the reproducing apparatus includes a pick-up device for picking up the image from the film; a read and write device for reading and writing frame information from and on the storage medium in a specified relative movement to the film; a drive device for rendering the specified relative movement and such special relative movement as fast transporting, rewinding; a directing device for directing the special relative movement; and a controller for keeping the drive device from rendering the special relative movement when the information reading and writing is performed.

15 Claims, 30 Drawing Sheets

FILM FEED DIRECTION →

SCAN DIRECTION →
← FILM FEED DIRECTION

IMAGE REPRODUCING APPARATUS

BACKGROUND OF THE INVENTION

This invention relates to all image reproducing apparatus for reproducing photographed images recorded a developed film on a television monitor (hereinafter refereed to as a TV monitor).

There have been proposed such photographed image reproducing apparatus. For example, Japanese Unexamined Patent Publication No. 59-79236 discloses an image reproducing apparatus in which a photographed image recorded on each frame of a developed film is picked up and converted into a video signal by photoelectric means and the video signal is sent to a TV monitor on which the image is in turn reproduced in accordance with the video signal. This image reproducing apparatus can also record photographic modification data on a magnetic medium provided on the film while displaying a photographed image on the TV monitor. Specifically, the image reproducing apparatus enables the user to clip a desired portion of a photographed image reproduced on the TV monitor and expand the clipped portion on the TV monitor at a desired magnification. Data about the clipped portion and magnification can be recorded on a magnetic medium on the film to print the clipped portion.

However, this publication does not disclose or teach an operational relationship between transporting of the film and recording of processing data on the film. For example, if the film is fast transported or rewound during recording of processing data, the processing data recording will be interrupted. Insufficient data will be consequently recorded on the film.

Also, there has been required an operational relationship between user's reproduction commands and transport of the film. For example, if the user commands reproduction while the film being fast transported or rewound, it is likely that a target frame is located out of the specified correct image sensing position. This will involve reproduction of an incomplete image.

SUMMARY OF THE INVENTION

It is an object of the present invention to provide an image reproducing apparatus which has overcome the problems residing in the prior art.

According to the present invent ion, an image reproducing apparatus for reproducing an image recorded on successive frames of a film having a storage medium which information for each frame is readable from and writable on, the reproducing apparatus comprises: reproduction means for reproducing the image; transfer means for reading and writing frame information from and on the storage medium in a specified relative movement to the film, the specified relative movement having a specified relative speed to the film and a specified relative direction to the film; drive means for rendering relative movements of the transfer means to the film, the drive means being capable of rendering the specified relative movement and a special relative movement; direction means for directing the special relative movement; judge means for judging whether the transfer means is in operation; and control means responsive to the judge means for keeping the drive means from rendering the special relative movement when the transfer means is judged to be in operation.

It may be appreciated to render the relative movement by transporting the film while holding at a fixed position a transfer device for performing the frame information reading and writing. Also, it may be appreciated to render the relative movement by moving the film and the transfer device relative to each other.

Further, an image reproducing apparatus of the present invention comprises: reproduction means for reproducing an image recorded on successive frames of a film having a storage medium from and on which information about each frame is readable and writable; transfer means for reading and writing frame information from and on the storage medium while the film being transported at a specified speed in a specified direction; first transport means for transporting the film in the specified speed at the specified direction; second transport means for transporting the film in a special manner; judge means for judging whether the transfer means is in operation; and control means responsive to the judge means for keeping the second transport means from being placed in operation when the transfer means is judged to be in operation.

It may be preferable to perform the picking up of image and the reading and writing of frame information simultaneously.

Further, an image reproducing apparatus of the present invention comprises: reproduction means for reproducing an image recorded on successive frames of a film having a storage medium from and on which information about each frame is readable and writable; transfer means for reading and writing frame information from and on the storage medium; judge means for judging whether the transfer means is in operation; and control means responsive to the judge means for keeping the film from entering into a special movement nothing to do with the in formation reading and writing when the transfer means is judged to be in operation.

It may be appreciated that the special movement is a movement of the film being fed out at a high speed. Also, it may be appreciated that the special movement is a movement of the film being rewound. Further, it may be appreciated that the special movement is a movement of the film being got out of a predetermined set position. It may be appreciated to further provide reproduction control means responsive to the judge means for controlling the reproduction means to suspend the image reproduction when the film enters into the special movement.

Moreover, the present invention is directed to an image reproducing apparatus for reproducing an image recorded on successive frames of a film having a storage medium which information for each frame is readable from and writable on, the reproducing apparatus comprising: transfer means for picking up the image from the film, and reading and writing frame information from and on the storage medium in a specified relative movement to the film; drive means for rendering relative movements of the transfer means to the film, the drive means being capable of rendering the specified relative movement and a special relative movement; direction means for directing the special relative movement: and control means for keeping the drive means from rendering the special relative movement when the transfer means is in operation.

With these image reproducing apparatus, during the time when frame information is being read or written on the storage medium, even if the transporting of film is directed, the film transporting is forcibly suspended. This will ensure complete reading and writing of frame information.

The above and other objects, features and advantages of the invention will become more apparent after having read the following detailed description of a preferred embodiment and its variations, which are illustrated in the accompanying drawings.

BRIEF DESCRIPTION OF THE DRAWINGS

FIG. 7 is a flowchart showing how the image reproducing apparatus is initialized after power-on;

DETAILED DESCRIPTION OF THE PREFERRED EMBODIMENT OF THE INVENTION

Figure 1:
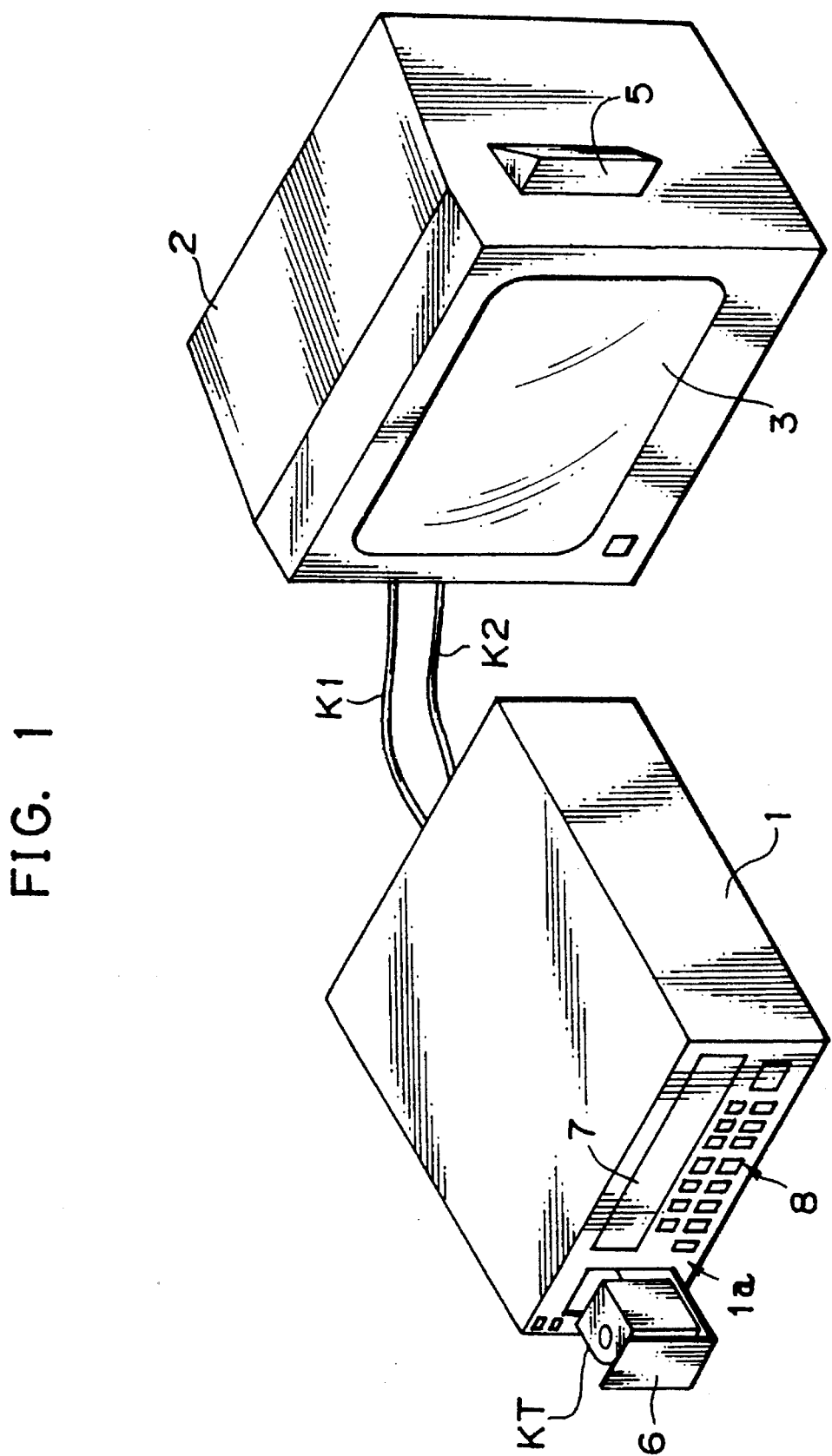
FIG. 1 is a perspective view showing an external construction of an image reproducing apparatus embodying the present invention.
Figure 2:
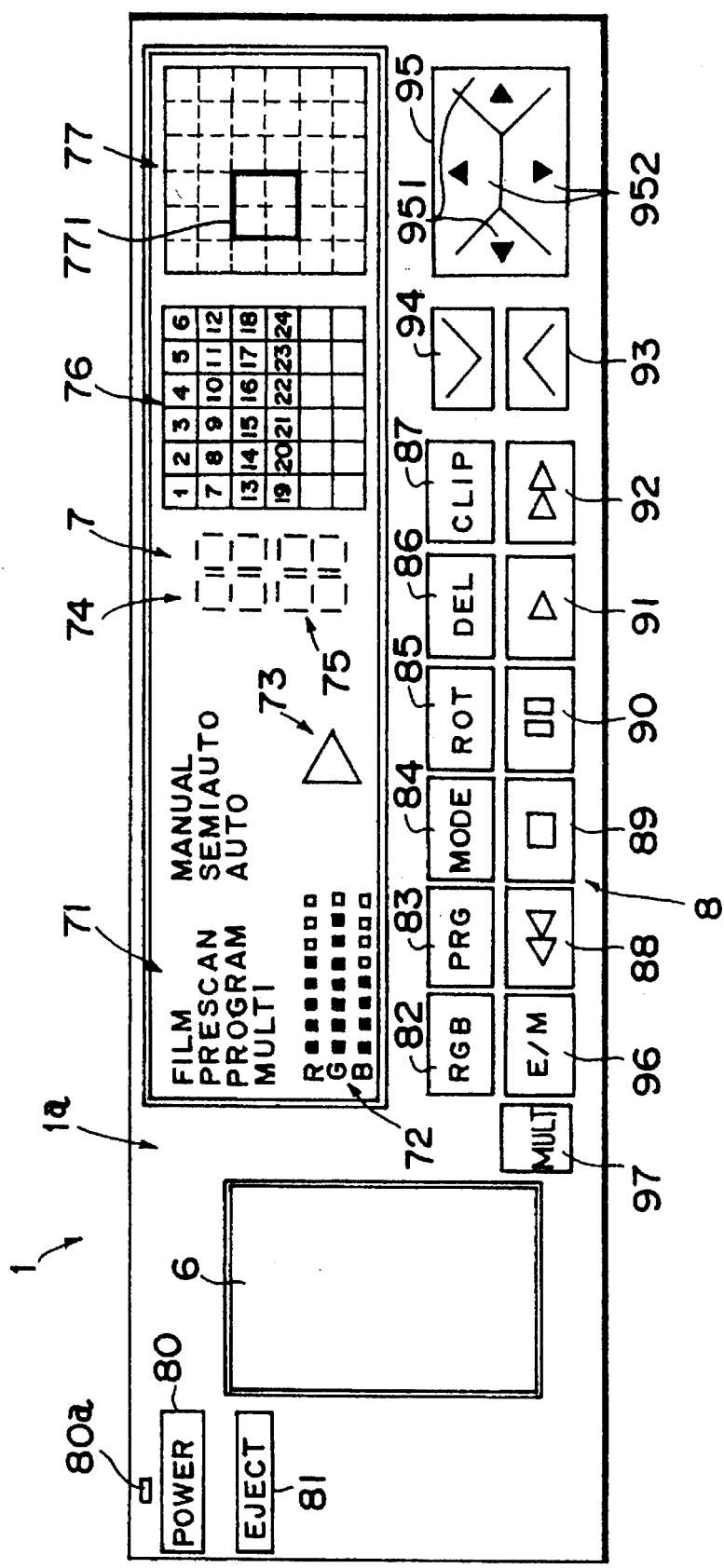
FIG. 2 is a front view showing a front panel of the image reproducing apparatus.
Figure 3:
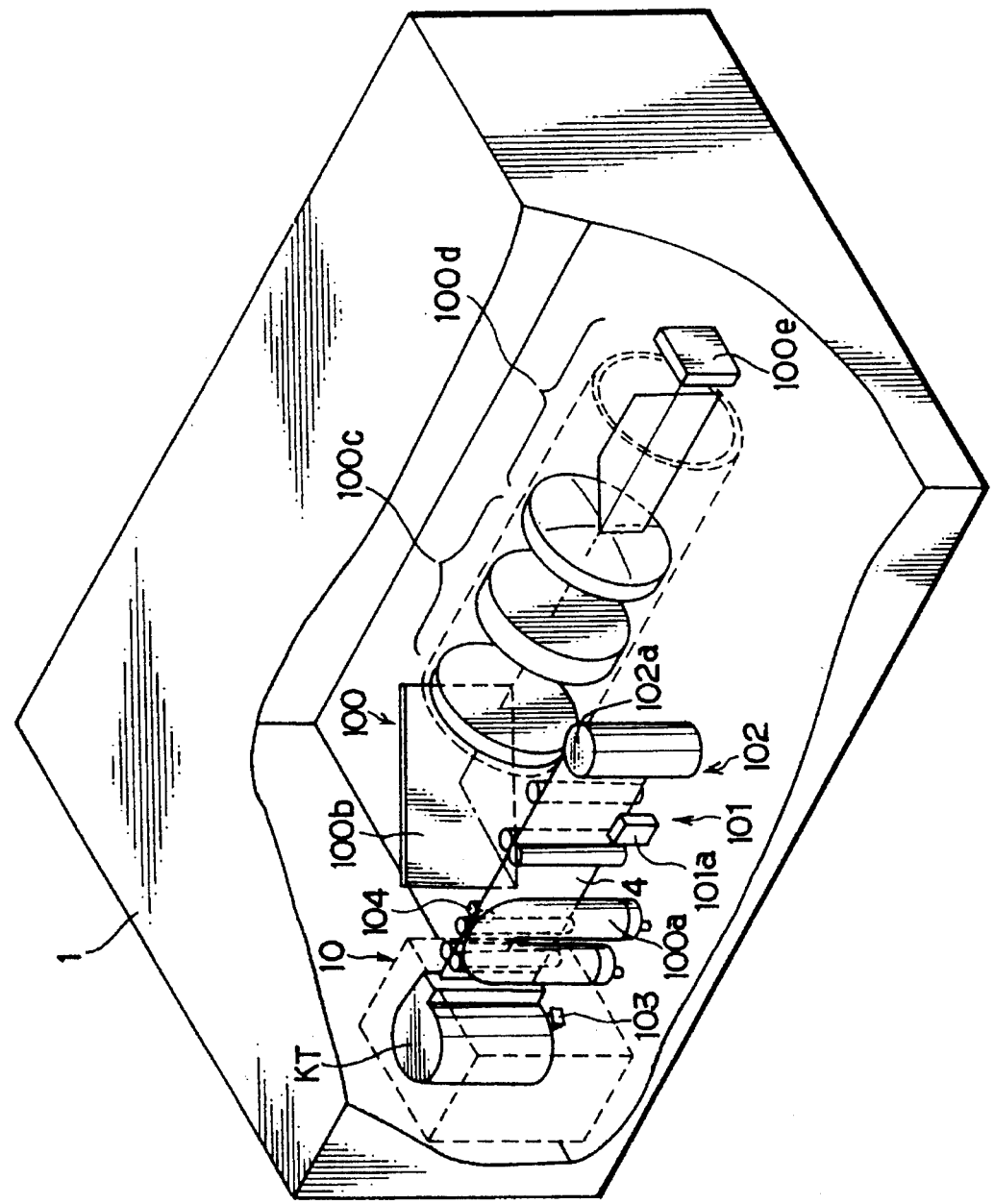
FIG. 3 is a partially sectioned perspective view showing principal components inside the image reproducing apparatus.

FIG. 1 is a perspective view of an image reproducing apparatus 1 of the present invention which is connected to a TV monitor 2. FIG. 2 is a front view showing a front panel 1a of the image reproducing apparatus 1. FIG. 3 is a partially sectioned perspective view showing principal components inside the image reproducing apparatus 1.

Figure 4:
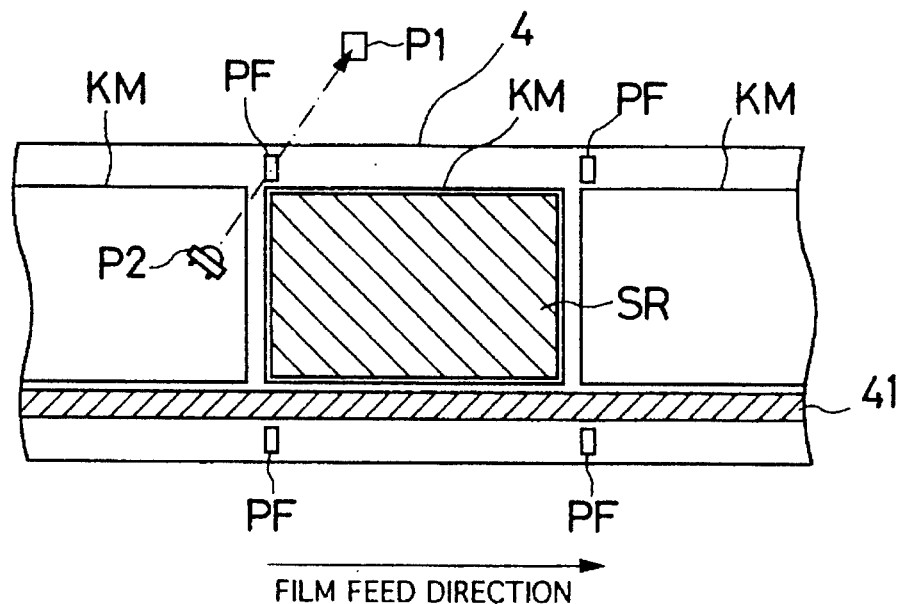
FIG. 4 is a diagram illustrating a positional relationship between a frame position detector, each perforation in a film and an image sensing area of an image pickup device.

A primary function of the image reproducing apparatus 1 is to pick up images recorded in individual frames of a developed film 4, which is loaded in a film cartridge KT as shown in FIG. 4, and reproduce images on a screen 3 of the TV monitor 2 in accordance with a programmed presentation. The image reproducing apparatus 1 provides not only a visual presentation of reproduced images but also background music or other forms of sounds. As will be described later, there are provided various controls and associated function on the front panel 1a of the image reproducing apparatus 1 to allow programming of visual and audible presentations.

The image reproducing apparatus 1 is connected to the TV monitor 2 by a cable K1 for video signals and a cable K2 for an audio signal as shown in FIG. 1. With this configuration, reproduced images are displayed on the screen 3 of the TV monitor 2 while sound is produced by a pair of speakers 5 one each on the right and left sides of the TV monitor 2.

The film 4 to be used with the image reproducing apparatus 1 has a pair of perforations PF at a rear end position of each frame along the film edges, as shown in FIG. 4. Also, there is formed a straight magnetic track 41 between the frames and perforations PF along the bottom edge of the film 4. The magnetic track 41 is adapted for recording photographic information such as title of image, date, time and place of photography, mode selection (e.g., panoramic mode) and kind of image (e.g., portrait, or landscape) for each individual frame as well as programmed presentation. Although the photographic information is usually recorded by a camera, it may be recorded by the image reproducing apparatus 1 if images are photographed by a camera not provided with means for writing photographic information.

As presentations, there are fade-in/fade-out, panning across a frame in a horizontal direction, tilting over a frame in a vertical direction, zoom-in/zoom-out, and superimposition of text data. Also, it may be appreciated to record information about selection of images to be reproduced, a reproducing order of different images, and vertical and/or horizontal inversion of a particular frame as presentation. Further, it may be appreciated to record sound generating information to add background music suited for individual images as well as narration as presentation, if necessary. The presentation is programmed in the process of editing and recorded on the magnetic track 41 on the film 4.

The front panel 1a of the image reproducing apparatus 1 is broadly divided into the following three portions: a cartridge table 6, a display section 7 and a control section 8. There are provided various switches on the control section 8 to control image reproduction and program a desired presentation.

The cartridge table 6 at a left of the front panel 1a can slide between a projected position and a retracted position. Mounted on the cartridge table 6, a film cartridge KT is taken into the image reproducing apparatus 1 and loaded in a film loader 10 as shown in FIG. 3.

The display section 7 is located at an upper-right position of the front panel 1a, and divided into several display regions 71–77 for indicating various pieces of information. Indicated at 71 is a display region for indicating existence or non-existence of a film 4, and programming of film reading mode, program mode, image reproduction mode and edit mode. The legends "FILM", "PRESCAN", "PROGRAM", "MULTI", "MANUAL", "SEMIAUTO" and "AUTO" are used for indications in the display region 71.

The legend "FILM" indicates that a film 4 is loaded in the image reproducing apparatus 1 or mounted on the cartridge table 6. It appears, for example, when a film cartridge KT is being inserted or ejected. When the film cartridge KT is being ejected, the legend "FILM" flashes to warn that the cartridge table 6 will pop out and to make sure that the user removes the film cartridge KT after the cartridge table 6 has come out.

The legend "PRESCAN" indicates that "prescan" mode is currently selected. In the prescan mode, the image reproducing apparatus 1 can read images of all the frames and photographic information recorded on the film 4 and simultaneously display all the frames in a specified arrangement pattern on the TV monitor 2. This display will be referred to as multi-frame display mode in the following description. The multi-frame display mode allows simultaneous viewing of the individual frames so that the user can conveniently program a desired presentation. The programmed presentation information is first stored in an internal memory of an information reader/writer 101 (shown in FIG. 6) and written on the magnetic track 41 on the film 4. The prescan operation will be discussed later in further detail.

The legend "PROGRAM" appears when program mode is activated, and indicates that the image reproducing apparatus 1 is set ready to execute program mode operations. In the program mode, the user sets or programs which images are to be reproduced, in which order the selected images are to be reproduced, how the images are presented, how sounds are generated, and so on. The programmed image reproduction and sound insertion manners are recorded on the magnetic track 41 on the film 4 for later presentation.

The legend "MULTI" indicates that the multi-frame display mode is activated. In this display mode, multiple frames are simultaneously displayed on the screen 3 of the TV monitor 2.

The legend "MANUAL", "SEMIAUTO" or "AUTO" is illuminated depending on which edit mode is selected when programming a desired presentation for the film 4. Controlled by a mode switch 84, the image reproducing apparatus 1 actually provides choices of four edit modes: random operating mode, manual mode, semiautomatic mode and full automatic mode. The legends "MANUAL", "SEMIAUTO" and "AUTO" correspond to the manual mode, semiautomatic mode and full automatic mode, respectively. If none of these legends is illuminated, the random operating mode is currently selected.

Figure 6:
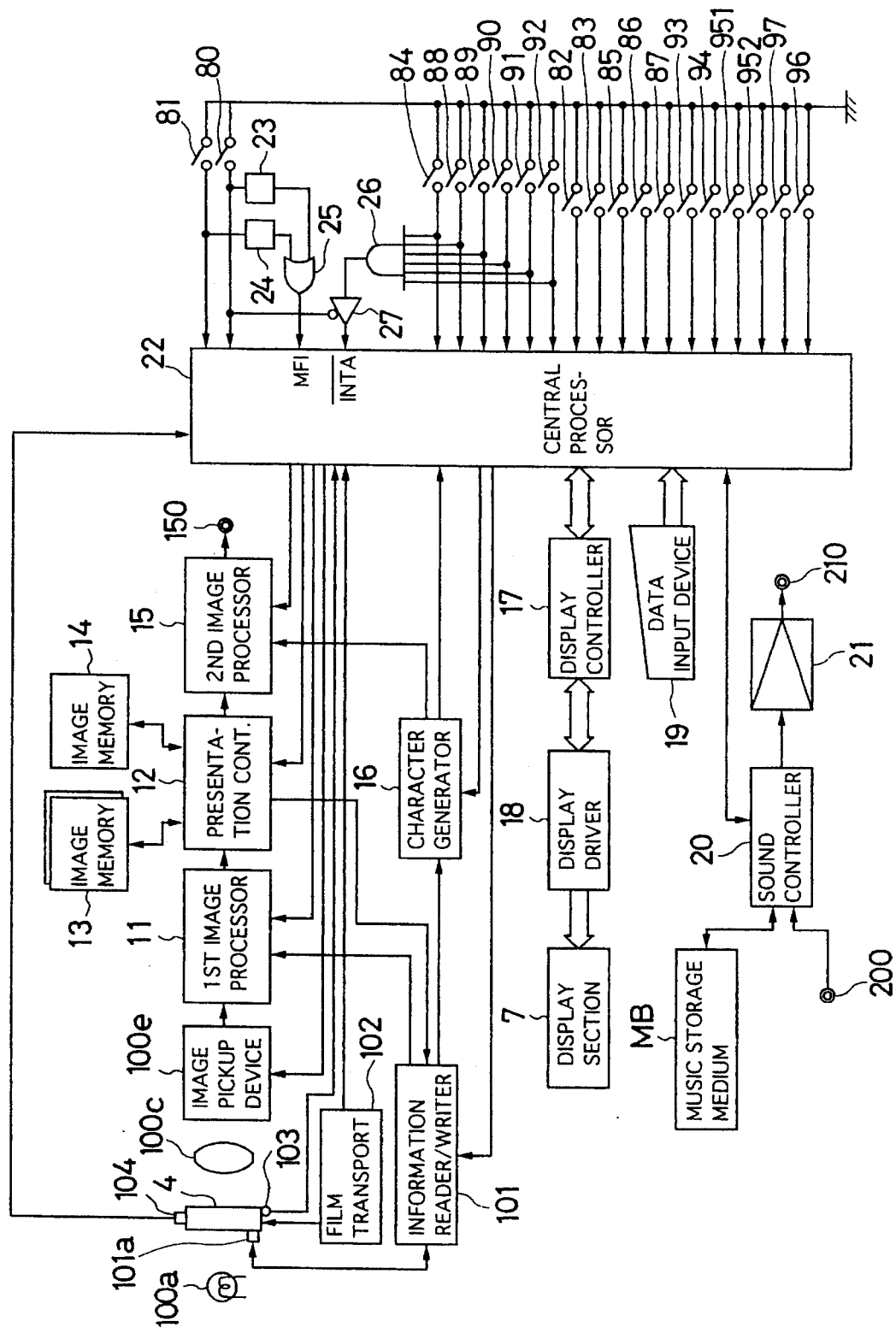
FIG. 6 is a block diagram showing a construction of the image reproducing apparatus.

In the random operating mode, the user operates manually a data input device 19 shown in FIG. 6 to perform selection of frames to be reproduced, addition of background music or other sounds, and reproduce images without a programmed presentation. The random operating mode provides an on-the-spot presentation of photographed images. It is useful not only for reproducing individual images in a desired presentation but for comparative evaluation of different presentations when programming a desired presentation.

In the random operating mode, the user enters control data for presentation through the data input device 19. The image reproduction is controlled in accordance with the control data. It is also possible to additionally input music, narration or other sound information via an external audio input terminal 200 shown in FIG. 6.

In the manual mode, the user manually programs image reproduction and sound generating programs. Images on the film 4 are reproduced with sounds in accordance with the manually programmed presentation.

In the semiautomatic mode, the user manually programs either an image reproduction program or a sound generating program. The image reproducing apparatus 1 is provided with an automatic setup function to facilitate programming of an image reproduction program and insertion of background music. In the semiautomatic mode, in the case of an image reproduction program being manually programmed, a sound generating program is programmed automatically to suit to the manually programmed image reproduction program. Conversely, in the case of a sound generating program being manually programmed, an image reproduction program is automatically programmed to suit to the manually programmed sound generating program. Accordingly, in the case of the image reproduction program being manually programmed in the semiautomatic mode, images on the film 4 are reproduced in accordance with the manually programmed program while sounds are generated automatically along with the reproduced images.

In the full automatic mode, image reproduction and sound generating programs are automatically programmed according to a predetermined scheme. The image reproducing apparatus 1 is provided with a plurality of predetermined schemes each having a combination of image reproduction and background music generating programs. Therefore, in the case of a desired presentation being programmed in the full automatic mode, individual images on the film 4 are reproduced with sounds in accordance with the automatically programmed presentation.

Indicated at 72 is a display region including red, green and blue signal level indicators for monitoring color balance status of reproduced images. Indicated at 73 is a display region for indicating film transport status.

Indicated at 74 is a display region for indicating frame numbers. It provides a digital readout of frame numbers during an image reproduction or prescan mode showing which frame are currently reproduced. Indicated at 75 is a display region for digital readout of background music numbers. The image reproducing apparatus 1 incorporates a music storage medium MB shown in FIG. 6, in which a plurality of musical scores are already recorded. When programming a presentation, the user can select a desired piece of background music from those recorded in the music storage medium MB. The display region 75 indicates a music number selected during the programming presentation and actual presentation. Indicated at 76 is a display region for indicating numbers of all the frames read from the film 4 in matrix form.

Indicated at 77 is a display region for indicating from which portion of a frame the image shown on the screen 3 of the TV monitor 2 has been cropped. The image reproducing apparatus 1 has an image reproduction mode for displaying an enlarged view of a specified portion of a reproduced image. This mode will be hereinafter referred to as the clipping mode. When the slipping mode is selected, a portion specified within the currently reproduced image is enlarged and displayed on the screen 3 of the TV monitor 2, and the cropped portion is indicated in the display region 77. The display region 77, corresponding to the whole area of a single frame, is divided into a plurality of region arranged in a matrix. Regions contained in the cropped portion are circumscribed by border lines 771 in the display region 77 to indicate approximate local ion of the cropped portion.

The control section 8 includes a power switch 80, an eject switch 81 and a power indicator 80a located at the upper-left corner of the front panel 1a and various switches 82–97 arranged in two horizontal rows below the display section 7.

The power switch 80 is a main on/off switch of the image reproducing apparatus 1. Each press of the power switch 80 alternately powers on and off the image reproducing apparatus 1. The image reproducing apparatus 1 is started up when the power switch 80 is turned on; stopped when the power switch 80 is turned off. The power indicator 80a indicates the state of the power switch 80. It is illuminated when the power switch 80 is on; extinguished when the power switch 80 is off.

The eject switch 81 is an alternate push button switch for controlling the cartridge table 6 for insertion and ejection of cartridge. When the eject switch 81 is set to an ON state by a first press, the cartridge table 6 is retracted into the image reproducing apparatus 1. Then, a second press turns the eject switch 81 to an OFF state, causing the cartridge table 6 to pop out from the image reproducing apparatus 1.

Indicated at 82 is a color adjustment switch which is used in conjunction with a zoom-in switch 93 and a zoom-out switch 94 (to be described later) to adjust red, green and blue signal levels of reproduced images. The color adjustment switch 82 selects a color component, red, green or blue, and the zoom-in switch 93 and zoom-out switch 94 to adjust the signal level of the selected color. More specifically, successive presses of the color adjustment switch 82 cyclically select the red, green and blue colors in this order. Then, successive presses of the zoom-in switch 93 increases the signal level of the selected color at predetermined incremental steps. Similarly, successive presses of the zoom-out switch 94 decreases the signal level of the selected color at predetermined incremental steps.

During color adjustment, signal level statuses of the individual colors are indicated by the red, green and blue signal level indicators of the display region 72 so that the user can monitor the results of adjustment.

Indicated at 83 is a program switch for activating the program mode. Successive presses of this switch cause it to alternate between ON and OFF slates. When the program switch 83 is set to an ON state, the image reproducing apparatus 1 selects the program mode illuminating the legend "PROGRAM" on the display section 7. When the program switch 83 is set to an OFF state, the program mode is deactivated and the legend "PROGRAM" is extinguished.

The mode switch 84 selects one of the aforementioned four edit modes. Successive presses of this switch cyclically select the random operating mode, manual mode, semiautomatic mode and full automatic mode in this order. As already described, the selected edit mode, except for the random operating mode, is displayed by a corresponding legend illuminated in the display region 71.

Indicated at 85 is a rotation switch for rotating a reproduced image. The image reproducing apparatus 1 is basically designed to display landscape shots in their correct orientation on the TV monitor 2. If the image reproducing apparatus reproduces all images in their original orientations regardless of the framing format, landscape or portrait, portrait shots will appear toppled over on their sides. The rotation switch 85 allows the user to rotate portrait shots by 90 degrees so that they will be reproduced as upright images on the TV monitor 2.

Indicated at 86 is a delete switch for specifying those frames which the user does not want to reproduce among all the frames read from the film 4.

A clip switch 87 is a dual-action on/off switch for activating and deactivating the clipping mode. The clip switch 87 becomes ON when depressed, activating the clipping mode. It becomes OFF at its extended position, deactivating the clipping mode.

Indicated at 88 is a rewind switch for rewinding the film 4 into the film cartridge KT; indicated at 89 is a stop switch for stopping image reproduction and film transport actions; indicated at 90 is a pause switch for temporarily halting the image reproduction; indicated at 91 is a reproduction switch that causes the image reproducing apparatus 1 to start reproduction of each image; and indicated at 92 is a fast forward switch for quickly feeding the 4 from the film cartridge KT.

The zoom-in switch 93 and zoom-out switch 94 are switches for enlarging and reducing a reproduced image to be displayed on the screen 3 of the TV monitor 2. With each press of the zoom-in switch 93, the on-screen image is enlarged to a close-up view at a predetermined ratio. Contrarily, with each press of the zoom-out switch 94, the on-screen image is reduced to a wide-angle view at a predetermined ratio.

A group of switches indicated at 95 contains right/left panning switches 951 and up/down tilting switches 952. The image reproduced on the screen 3 of the TV monitor 2 is scrolled horizontally when either panning switch 951 is operated. The image is scrolled vertically when either of the tilting switch 952 is operated.

Indicated at 96 is a select switch for choosing whether to program the image reproduction or sound generating manner manually in the semiautomatic mode. Successive presses of the select switch 96 alternately select the image reproduction and sound generating manners for manual programming.

Indicated at 97 is a multi-frame display switch for switching the on-screen presentation between multi-frame and single-frame display modes. In the multi-frame display mode, the TV monitor 2 simultaneously displays all the frames of the film 4 on its screen 3 while only one specified frame is displayed in the single-frame display mode. Successive presses of the multi-frame display switch 97 alternately select the two display modes, in the previously mentioned prescan mode, a multi-frame presentation is automatically selected regardless of the setting of the multi-frame display switch 97.

Referring now to FIG. 3, the film loader 10 and its associated components are described in the following.

Provided at a compartment where the cartridge table 6 is stored, the film loader 10 is associated with an image reader 100, an information reader/writer 101, a film transport 102, a film detecting switch 103 and a frame position detector 104.

The image reader 100 comprises a light source 100a, a mirror 100b, a image magnifier 100c, an image rotating device 100d and an image pickup device 100e. The light source 100a, which may be a fluorescent lamp, a xenon lamp or a tungsten halogen lamp, for example, illuminates an image on the film 4 at a specified luminous intensity. The mirror 100b reflects the illuminated image toward the image magnifier 100c. Comprising a lens or a lens group as well as a diaphragm and a light measuring sensor (not illustrated), the image magnifier 100c regulates the amount of light incident upon the image pickup device 100e by adjusting the diaphragm according to a result of measurement by the light measuring sensor. The image magnifier 100c can vary its magnification by driving the lens (or lens group) to adjust the size of a light image projected upon the image pickup device 100e according to the operation of the zoom-in switch 93 or zoom-out switch 94 on the control section 8.

The image rotating device 100d comprises a prism for optically rotating the light image to be projected upon the image pickup device 100e by 90!. As described above, the image reproducing apparatus 1 displays a landscape shot in its correct orientation on the TV monitor 2. Therefore, a portrait shot will appear toppled over on its side if it is reproduced in its original frame orientation. When reproducing a portrait shot, the image rotating device 100d rotates the light image be projected upon the image pickup device 100e by 90 degrees so that the image is reproduced in the upright position.

The image magnifier 100c and image rotating device 100d call rotate together about their common optical axis. As they are rotated by 90 degrees, the light image projected upon the image pickup device 100e is also rotated by 90 degrees. To give an example of arrangement for controlling the image magnifier 100c and image rotating device 100d, the information reader/writer 101 reads image orientation information recorded frame by frame on the magnetic track 41 on the film 4. Based on this information, it is possible to determine whether or not to rotate the image magnifier 100c and image rotating device 100d when picking up an image from each frame so that all images are reproduced in their correct orientations.

The image pickup device 100e comprises, for example, a color area image sensor including a charge-coupled device (hereinafter referred to as the CCD) associated with red, green and blue color filters. The image pickup device 100e integrates the light image formed through the image rotating device 100d during an exposure time determined in accordance with the result of measurement by the aforementioned light measuring sensor. The image pickup device 100e then produces an image signal in analog form through a photoelectric conversion process, The image signal picked up by the CCD of the image pickup device 100e is separated into red, green and blue image signal components and delivered to a succeeding image processing stage.

Provided with a magnetic head 101a and an unillustrated internal memory, the information reader/writer 101 writes the presentation information on and reads the photographic information and presentation information from the magnetic track 41 on the film 4. More specifically, the information reader/writer 101 reads the photographic information and presentation informal ion recorded frame by frame on the magnetic track 41 on the film 4 by means of the magnetic head 101a and stores the same in the internal memory. Also, the information reader/writer 101 writes the presentation created in the prescan mode or programming process in the internal memory and on the magnetic track 41 on the film 4. Information read/write operations to and from the magnetic track 41 are performed while the film 4 is being rewound at a specified speed back to the film cartridge KT.

Comprising a spool 102a and an unillustrated drive motor, the film transport 102 feeds the film 4 from and rewinds the film 4 to the film cartridge KT according to instructions from a central processor 22 to be described later. The film 4 is supplied from the film cartridge KT when the drive motor rotates in its forward direction and rewound back to the film cartridge KT when the drive motor rotates in its reverse direction.

The film detecting switch 103 detects the film cartridge KT when it is loaded into the film loader 10. The frame position detector 104 comprises a photointerrupter including an optical sensing device P1 and a light-emitting device P2 for detecting perforations formed at specified positions relative to individual frames of the film 4 as illustrated in FIG. 4. Frame-by-frame film feeding and rewinding operations are controlled by the central processor 22 based on a detection signal produced by the frame position detector 104. The photo interrupter is arranged so that a frame KM is exactly aligned with an image sensing area SR of the image pickup device 100e when the light emitted by the light-emitting device P2 is just received by the optical sensing device P1 through a perforation PF.

Figure 5:
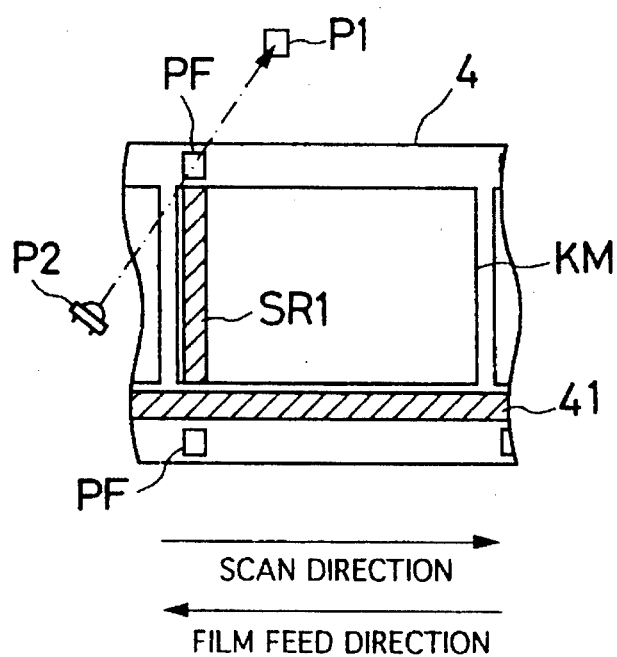
FIG. 5 is a diagram illustrating a positional relationship between the frame position detector, each perforation in the film and an image sensing area of an image pickup device including a line image sensor.

Although it has been assumed in the above description that the image pickup device 100e employs an area image sensor, it is also possible to use a line image sensor as a photoelectric element. In the latter case, the photointerrupter is arranged so that the extreme forward part of a frame KM, for example, is exactly aligned with an image sensing area SR1 of the image pickup device 100e when the light emitted by the light-emitting device P2 is just received by the optical sensing device P1 through a perforation PF, as shown in FIG. 5. Starting from this position, the image pickup device 100e scans and picks up a whole image across the frame KM as the film 4 is fed past the line image sensor.

FIG. 6 is a block diagram showing a construction of the image reproducing apparatus 1 described above. In FIG. 6, parts identical to those shown in FIGS. 2 and 3 are designated by the same reference numbers.

Indicated at 11 is a first image processor which performs specified image processing on the image signals of the individual frames picked tip by the image pickup device 100e and, where necessary, compresses the image signals. More specifically, the first image processor 11 carries out such image processing as analog-to-digital conversion, pedestal adjustment, white clipping and gamma correction individually on red, green and blue channels and outputs the processed image signals to presentation controller 12. When in the multi-frame display mode, the processed image signals are compressed at a specified compression ratio before they are transmitted to the presentation controller 12.

The presentation controller 12 transfers the image signals received from the first image processor 11 to an image memory 13 or 14 for storage according to a control signal coming from the central processor 22. The image memory 13 is a memory for a single-frame representation. It stores image signals for a single frame to be reproduced on the TV monitor 2. The image memory 14 is a memory for a multi-frame presentation. It stores image signals for multiple frames which will be arranged in a predefined pattern on the screen 3 of the TV monitor 2. When a control signal specifying a single-frame presentation comes from the central processor 22, the presentation controller 12 causes the image memory 13 to store the image signals for a single frame received from the first image processor 11. When a control signal specifying a multi-frame presentation comes from the central processor 22, the presentation controller 12 causes the image memory 14 to store the compressed image signals for the individual frames received from the first image processor 11.

Next, the presentation controller 12 reads the image signals from the image memory 13, processes them according to the presentation information to produce necessary presentation effects and outputs the resultant image signals to a second image processor 15 in the single-frame display mode. More specifically, the presentation controller a 12 has a presentation effect generating function to produce such effects as panning, zooming, cropping and fade-in/fade-out. It reads not only the image signals from the image memory 13 but also the presentation information from the information reader/writer 101, whereby the image signals are processed according to the presentation information before they are transferred to the second image processor 15. In the multi-frame display mode, the presentation controller 12 reads the image signals for multi-frame presentation from the image memory 14 and transfers them to the second image processor 15.

The second image 15 superimposes alphanumeric data, such as a title of image, date and time of photography, received from a character generator 16 over the image data received from the presentation controller 12. Then, the second image processor 15 converts the image signals into NTSC color television signals, for example. The color television signals are outputted from a video output terminal 150 and delivered to the TV monitor 2 via the cable K1. The character generator 16 generates alphanumeric data to be superimposed on a reproduced image. It generates characters based on the photographic information including a title of image, date and time of photography read from the information reader/writer 101 according to a control signal received from the central processor 22 and outputs such data to the second image processor 15 for superimposition.

Indicated at 17 is a display controller for controlling indications on the individual display regions 71–77 of the display section 7 via a display driver 18 according to a control signal received from the central processor 22. The data input device 19 allows the user to enter numbers of frames to be reproduced, region to be cropped, text data such a title of image, and so on.

The music storage medium MB is a memory such as a magnetic tape, a semiconductor memory device or an IC card for storing a plurality of musical scores. Although the music storage medium MB is typically incorporated in the image reproducing apparatus 11. It may be accommodated in the film cartridge KT together with the film 4 but as a separate medium from the film 4.

Indicated at 20 is a sound control let for controlling music and sound presentations during image reproduction according to a control signal received from the central processor 22. The sound controller 20 produces an audio signal based on the musical score selected from those stored in the music storage medium MB. The audio signal is amplified by an amplifier 21, outputted from an audio output terminal 210 and delivered to the TV monitor 2 through the cable K2.

The sound controller 20 can also handle external audio signals including music, narration and other sounds injected from the external audio input terminal 200 according to a control signal received from the central processor 22. The audio signal is amplified by the amplifier 21 and outputted from audio output terminal 210. On the other hand, it is stored in the music storage medium MB.

In the random operating mode, when a user enters data about a music presentation through the data input device 19, the central processor 22 transmits a corresponding control signal to the sound controller 20. As a result, an audio signal introduced from the external audio input terminal 200 is outputted from the audio output terminal 210 according to the operation of the user to produce background music (or another form of sound) from the speakers 5 of the TV monitor 2.

In the manual mode or semiautomatic mode, when the user enters data about a music presentation through the data input device 19, the central processor 22 transmits a corresponding control signal to the sound controller 20. As a result, an audio signal introduced from the external audio input terminal 200 is recorded in the music storage medium MB. While presenting the film 4, the audio signal recorded in the external audio input terminal 200 is outputted from the audio output terminal 210 according to a control signal from the central processor 22 to produce background music (or other sounds) from the speakers 5 of the TV monitor 2.

The central processor 22 has an internal memory (not illustrated) to store a program for controlling its operation. The central processor 22 controls individual elements of the image reproducing apparatus 1 according to various operations on the control section 8 and the program installed in the internal memory. When the reproduction switch 91 is turned on, the central processor 22 judges whether a frame KM of the film 4 is exactly aligned with the image sensing area SR of the image pickup device 100e based on a perforation detection signal fed from the frame position detector 104. When it is judged that the frame KM is aligned with the image sensing area SR, the central processor 22 causes the image reader 100 to pick up an image in the frame KM. Further, the central processor 22 stores in its internal memory a plurality of predetermined reproducing manners.

Pulse generators 23 and 24 and an OR circuit 25 produce together an interrupt signal (hereinafter referred to as an MFI interrupt signal) when the power switch 80 or eject switch 81 is pressed. The pulse generator 23 produces a pulse having a specified pulsewidth and outputs it to the OR circuit 25 each time the power switch 80 is pressed. Similarly, the pulse generator 24 produces a pulse having a specified pulsewidth and outputs it to the OR circuit 25 each time the eject switch 81 is pressed. The OR circuit 25 in turn produces an MFI interrupt signal when a pulse is received from either the pulse generator 23 or pulse generator 24 and transmits the MFI interrupt signal to an MFI terminal of the central processor 22. When the MFI interrupt signal is entered from the OR circuit 25, the central processor 22 executes an MFI interrupt subroutine which will be described later referring to FIG. 8.

An AND circuit 26 and a buffer circuit 27 produce together an interrupt signal (hereinafter referred to as an INTA interrupt signal) when the mode switch 84, rewind switch 88, stop switch 89, pause switch 90, reproduction switch 91 or fast forward switch 92 is pressed.

Six signal lines coming from the mode switch 84, rewind switch 88, stop switch 89, pause switch 90, reproduction switch 91 and fast forward switch 92 and a high-level signal line from the central processor 22 are connected to the AND circuit 26. When none of the six switches are ON, the output of the AND circuit 26 is kept at a high-level. If any one of the switches is pressed, a low-level signal is inputted to AND circuit 26 through the corresponding signal line. As a result, the AND circuit 26 outputs a low-level signal, or an INTA interrupt signal, to the buffer circuit 27.

The buffer circuit 27 is to pass and output the input signal only if the power switch 80 in an ON state. Therefore, when the power switch 80 is ON and none of the above-mentioned six switches are activated, a high-level output signal of the AND circuit 26 passes through the buffer circuit 27 and enters the central processor 22 through its INTA terminal. Also, when the power switch 80 is ON and any one of the six switches is activated, a low-level INTA interrupt signal outputted from the AND circuit 26 passes through the buffer circuit 27 and enters the central processor 22 through its INTA terminal. When the INTA interrupt signal is entered through the INTA terminal, the central processor 22 executes an INTA interrupt subroutine which will be described later referring to FIG. 15.

Referring now to flowcharts of FIGS. 7 to 24, operation flows of the image reproducing apparatus 1 will be described below.

Figure 7:
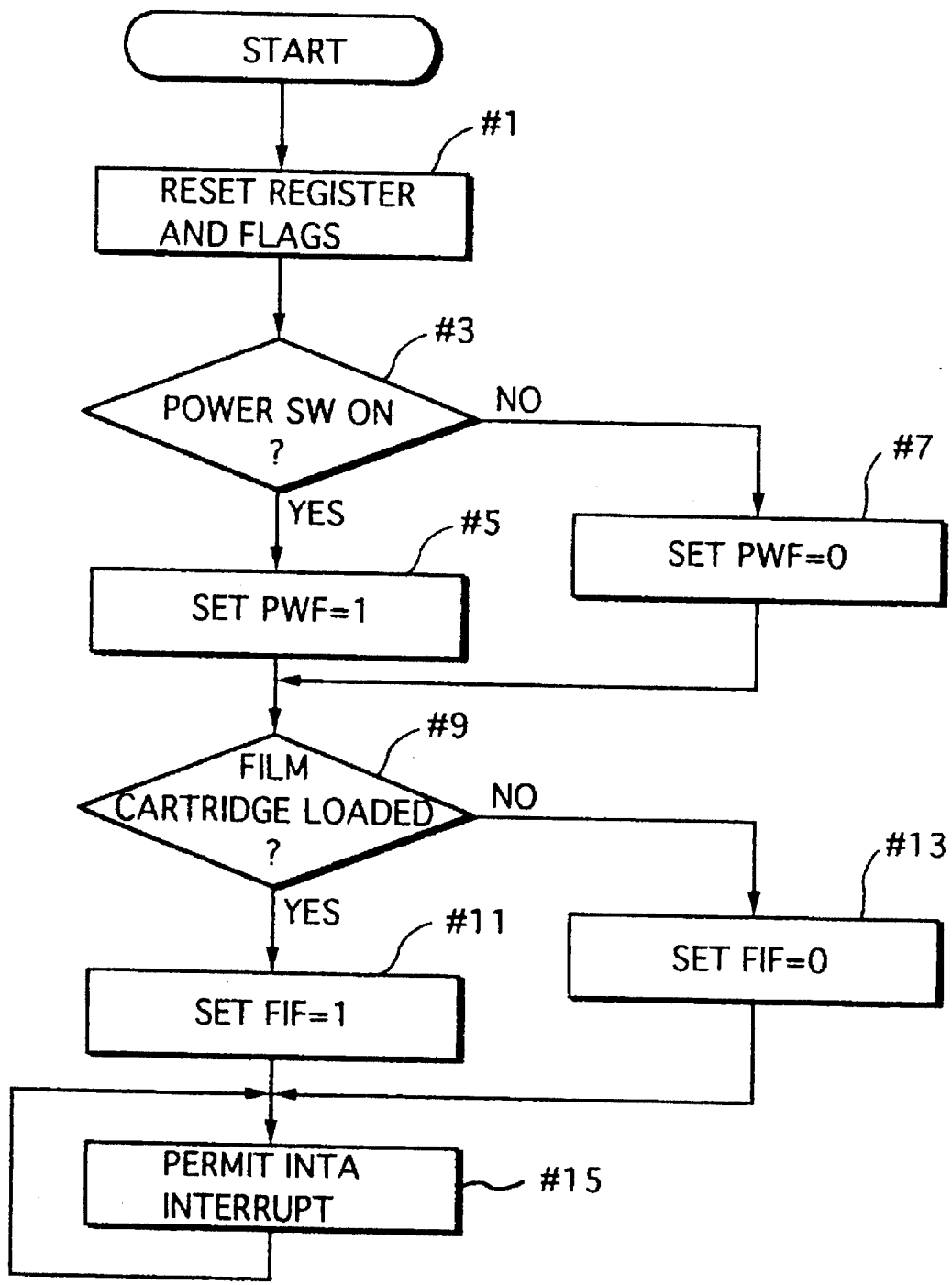

FIG. 7 is a flowchart showing how the image reproducing apparatus 1 is initialized after power-on.

First, an internal register and flags of the central processor 22 are reset (Step #1) and it is judged whether the power switch 80 is ON (Step #3), if the power switch 80 is ON (YES in Step #3), a power supply flag PWF is set to "1" in Step #5. If the power switch 80 is OFF (NO in Step #3), the power supply flag PWF is reset to "0" in Step #7.

Next, it is judged whether a film cartridge KT is already mounted in the film loader 10 based on a result of detection by the film detecting switch 103 (Step #9). If the judgment result is in the affirmative (YES in Step #9), a film detection flag FIF is set to "1" in Step #1, if the judgment result is the negative (NO in Step #9), the film detection flag FIF reset to "0" in Step #13.

Figure 8:
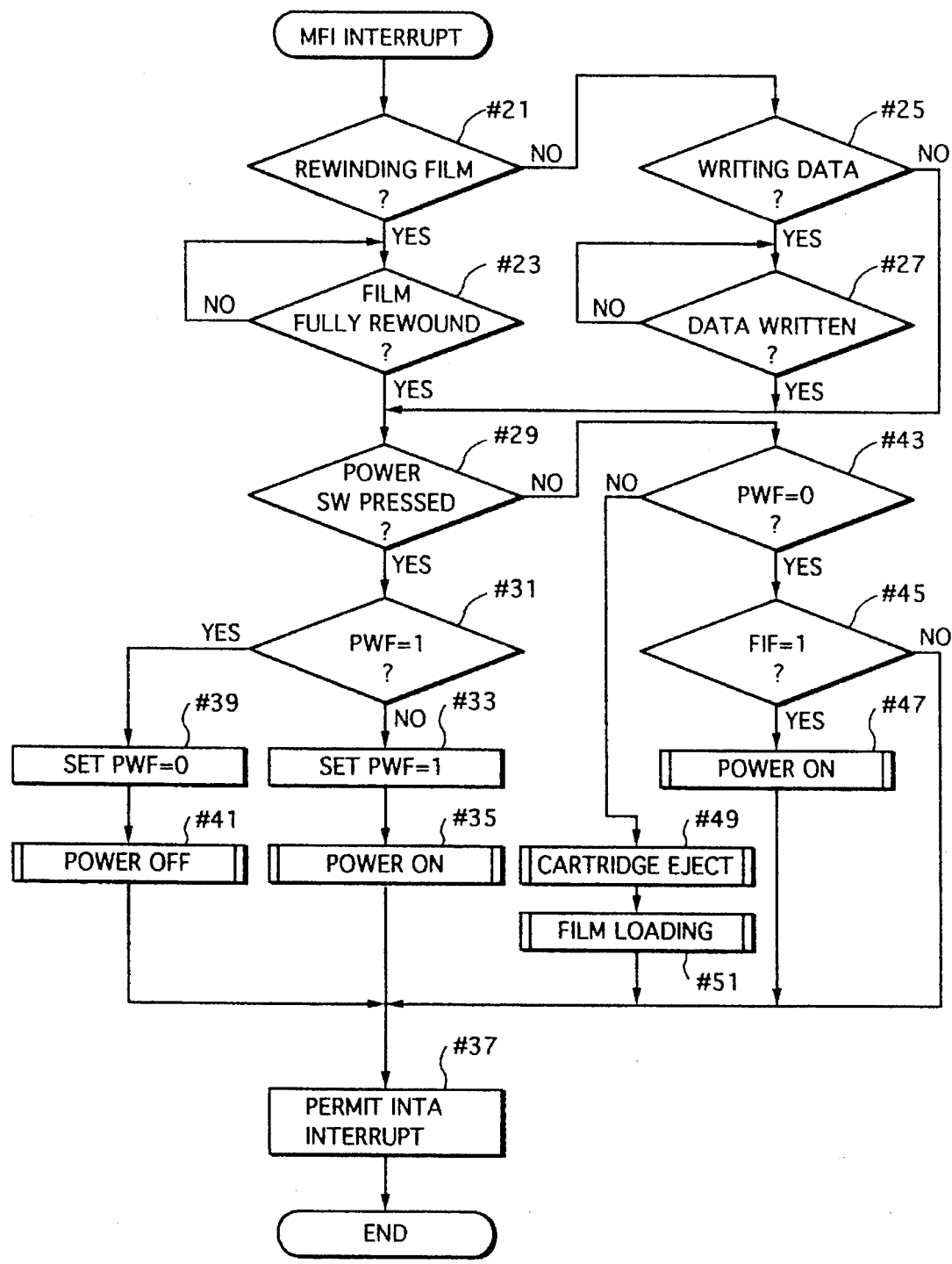
FIG. 8 is a flowchart showing an MFI interrupt subroutine which is executed when a power switch or an eject switch is pressed.
Figure 15:
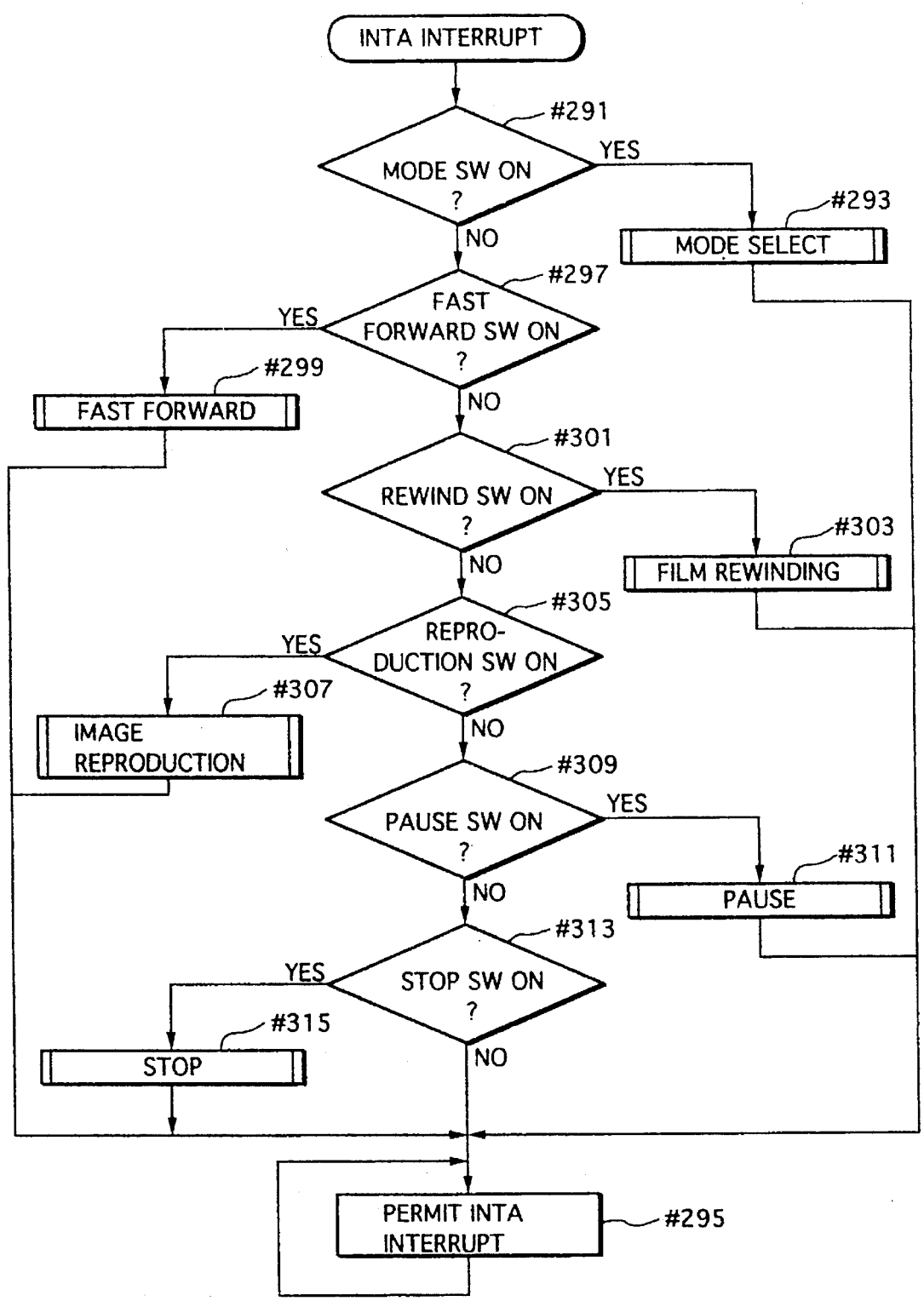
FIG. 15 is a flowchart showing an INTA interrupt subroutine.

Then, an INTA interrupt is permitted and the image reproducing apparatus 1 is put in to a waiting condition (Step #15). If the power switch 80 or eject switch 81 is operated at this time and a pulse produced by the pulse generator 23 or 24 is delivered to the MFI terminal via the OR circuit 25, the MFI interrupt subroutine shown in FIG. 8 is executed. On the other hand, if the mode switch 84, rewind switch 88, stop switch 89, pause switch 90, reproduction switch 91 or fast forward switch 92 is activated causing the buffer circuit 27 to transmit a low-level INTA interrupt signal to the INTA terminal and an interrupt is permitted at this time, the INTA interrupt subroutine shown in FIG. 15 is executed.

The MFI interrupt subroutine is described below referring to the flowchart of FIG. 8.

First, the judgment is made as to whether the film 4 is currently being rewound back the film cartridge KT (Step #21). If the judgment result is in the affirmative (YES in Step #21), the flow is suspended until the film 4 is fully rewound (Step #23) and then proceeds to Step #29. If the judgment result is in the negative (NO in Step #21), it is further judged in Step #25 whether any data such as reproduction information is currently being written on the magnetic track 41 on the film 4. If any data is being written (YES in Step #25), the flow is suspended until the data writing operation is completed (Step #27) and then proceeds to Step #29.

In Step #29 it is judged whether the power switch 80 has been pressed. If the judgment result is in the affirmative (YES in Step #29), it is further judged whether the power supply flag PWF is set to "1" (Step #31). If the power supply flag PWF is reset to "0" (NO in Step #31), the central processor 22 judges that the power switch 80 has been pressed to start up the image reproducing apparatus 1. In this case, after the power supply flag PWF has been set to "1" (Step #33), a power-on subroutine (Step #35) to be described later is executed and an INTA interrupt is permitted (Step #37).

Contrarily, if the power supply flag PWF is in a "1" state in Step #31, the central processor 22 judges that the power switch 80 has been pressed to turn off the image reproducing apparatus 1. In this case, after the power supply flag PWF has been reset to "0" (Step #39), a power-off subroutine (Step #41) to be described later is executed and the flow proceeds to Step #37.

On the other hand, if it is confirmed Step #29 that the power switch 80 has not been pressed (NO in Step #29), it is judged whether the power supply flag PWP is reset to "0" (Step #43). In the power supply flag PWF is set to "1" (NO in Step #43), the central processor 22 judges that the eject switch 81 has been pressed in order to load or eject a film cartridge KT. Thereafter, a cartridge eject subroutine (Step #49) and a film loading subroutine (Step #51 to be described later are executed in this order.

If the power supply flag PWF is in a "0" state in Step #43, it is further judged whether the film detection flag FIF is set to "1" (Step #45). If the film detection flag FIF is set to "1" (YES in Step #45), the central processor 22 judges that the eject switch 81 has been pressed in order to eject the film cartridge KT from the image reproducing apparatus 1 which is currently not operating. In this case, the power-on subroutine (Step #47) is executed and the cartridge table 6 pops out on the front panel 1a of the image reproducing apparatus 1.

On the other hand, if the film detection flag FIF is reset to "0" (NO in Step #45), there is no film cartridge KT mounted in the film loader 10 and, therefore, the flow skips the power-on subroutine of Step #47 and proceeds to Step #37.

Figure 9:
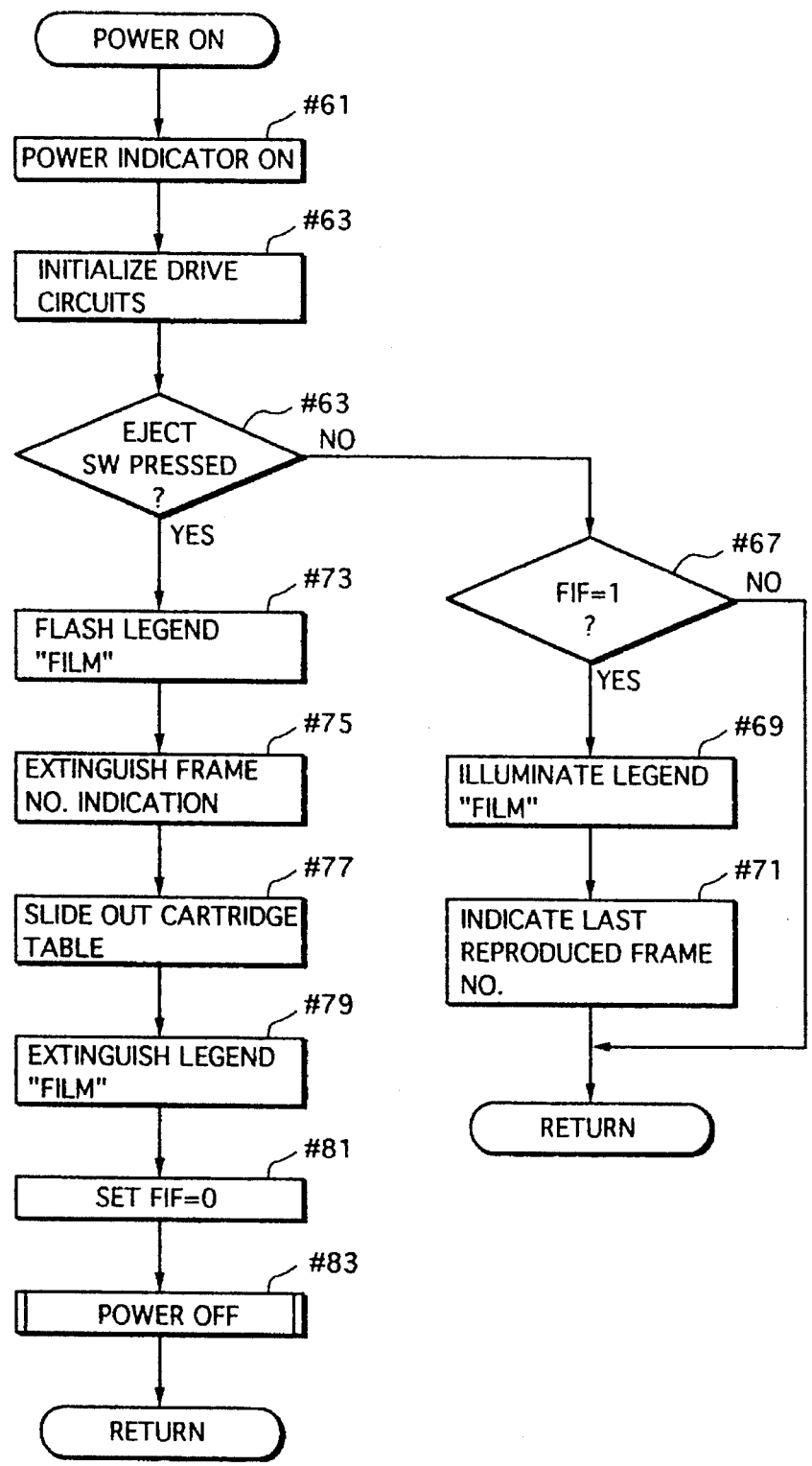
FIG. 9 is a flowchart showing a power-on subroutine.

The power-on subroutine of Steps #35 and #47 is described below referring to the flowchart of FIG. 9.

First, the power indicator 80a is lit and drive circuits of the film transport 102 are initialized (Steps #61 and #63). Then, it is judged whether the eject switch 81 has been pressed (Step #65).

The power-on subroutine of Step #35 is executed after the power switch 80 has been pressed (see Step #29). Therefore, the judgment result in Step #65 is in the negative and the flow proceeds to Step #67. In Step #67 it is judged whether the film detection flag FIF is set to "1". If the film detection flag FIF is set to "1" (YES in Step #67), the legend "FILM" is illuminated in the display region 71 of the display section and the flow returns to the flowchart of FIG. 8. On the contrary, if the film detection flag FIF is reset to "0" (NO in Step #67), the routine skips Steps #69 and #71 and returns to the flowchart of FIG. 8.

On the other hand, the power-on subroutine of Step #47 is executed after the eject switch 81 has been pressed (see Step #45). In this case, the judgment result in Step #65 is in the affirmative and the flow proceeds to Step #73. In Step #73 the legend "FILM" flashes in the display region 71 indicating that the film cartridge KT is being ejected. Subsequently, the frame number indication in the display region 74 is extinguished (Step #75), the film 4 is rewound back to the film cartridge KT and the cartridge table 6 pops out on the front panel 1a of the Image reproducing apparatus 1 (Step #77). The legend "FILM" is extinguished (Step #79) and the film detection flag FIF is reset to "0" (Step #81). Then, the power-off subroutine to be described later is executed (Step #83).

Figure 10:
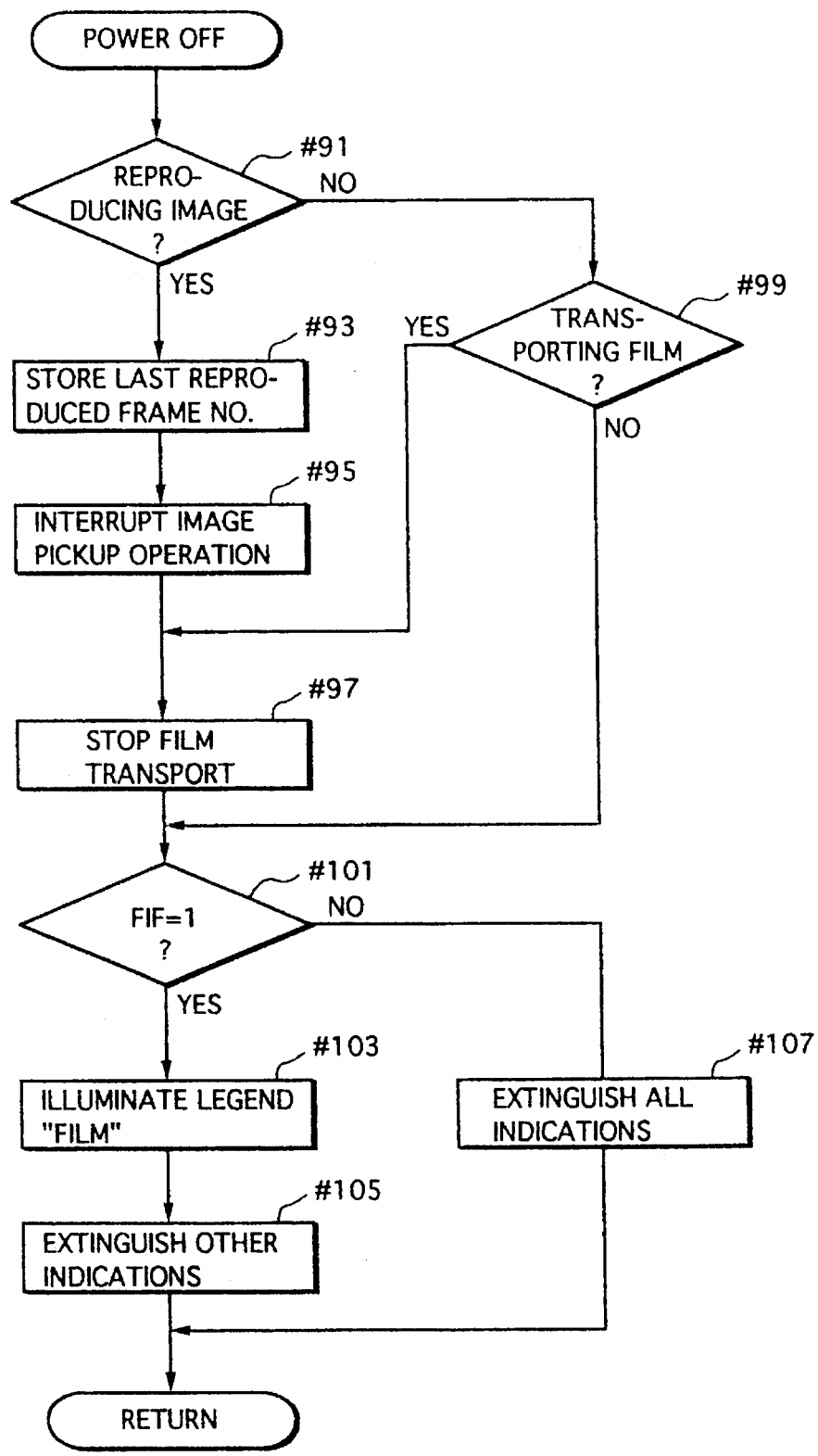
FIG. 10 is a flowchart showing a power-off subroutine.

Referring now to the flowchart of FIG. 10, the power-off subroutine of Steps #41 and #83 is described below.

First, it is judged whether an image reproducing operation is currently in progress (Step #91). If the judgment result is in the affirmative (YES in Step #91), the number of the frame which is currently reproduced is stored in the central processor 22 (Step #93). Then, the image pickup operation being carried out by the image pickup device 100e is interrupted (Step #95) and the film transport 102 is stopped. If a line image sensor is employed in the image pickup device 100e, film transport and image scanning operations are stopped.

If the judgment result in Step #91 is in the negative (NO in Step #91), it is further judged whether the film transport 102 is currently transporting the film 4 (Step #99). If the film 4 is being transported (YES in Step #99), the flow proceeds to Step #97, where the film transport 102 is stopped. If the film 4 is not currently transported (NO in Step #99), the flow proceeds to Step #101.

In Step #101 it is judged whether the film detection flag FIF is set to "1". If the film detection flag FIF is in a "1" state (YES in Step #101), the film cartridge KT is still mounted in the film loader 10. In this case, the legend "FILM" is illuminated in the display region 71 of the display section 7 and all other indications on the display section 7 are extinguished (Steps #103 and #105). Then, the flow returns to the flowchart of FIG. 8.

On the other land, if the film detection flag FIF is reset to "0" (NO in Step #101), the central processor 22 regards that there is no film cartridge KT remaining in the film loader 10. In this case, all the indications on the display section 7 are extinguished (Step #107).

Figure 11:
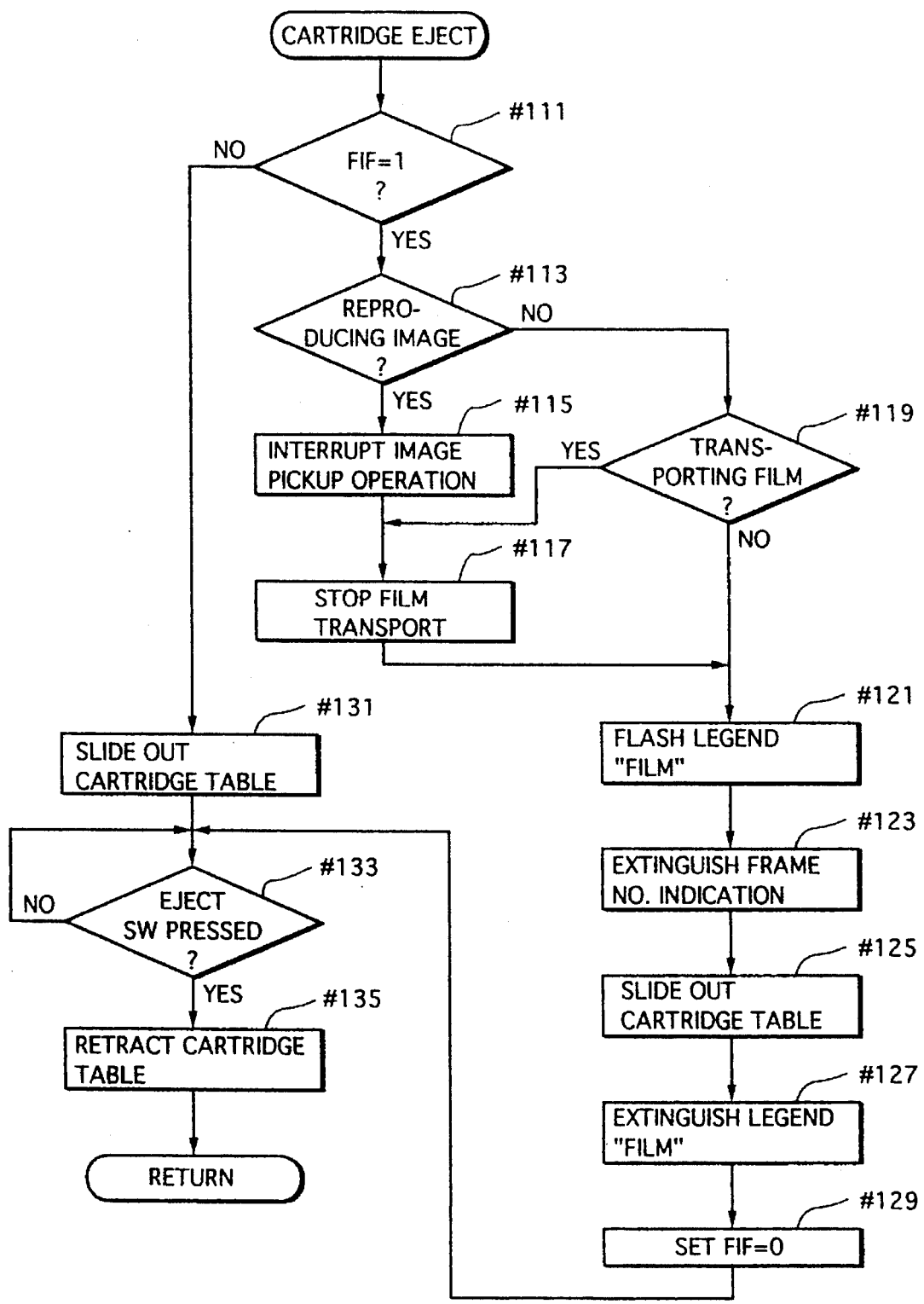
FIG. 11 is a flowchart showing a cartridge eject subroutine.

Referring now to the flowchart of FIG. 11, the cartridge eject subroutine of Step #49 is described in the following.

First, it is judged whether the film detection flag FIF is set to "1" (Step #111). If the judgment result is in the affirmative (YES in Step #111), it is further judged whether an image reproducing operation is in progress (Step #113). If any image is being reproduced (YES in Step #113), the image pickup operation being carried out by the image pickup device 100e is interrupted (Step #115), if a line image sensor is employed in the image pickup device 100e, the film transport operation of the film transport 102, is stopped in Step #117.

If the judgment result in Step #113 is in the negative (NO in Step #113), it is further judged whether the film transport 102 is currently transporting the film 4 (Step #119). If the film 4 is being transported (YES in Step #119), the flow proceeds to Step #111 where the film transport 102 is stopped. If the film 4 is not currently transported (NO in Step #119), the flow proceeds to Step #121.

In Step #121 the legend "FILM" flashes in the display region 71 of the display section 7 indicating that the film cartridge KT is being ejected. Subsequently, the frame number indication in the display region 14 is extinguished (Step #123), the film 4 is rewound back to the film cartridge KT and the cartridge table 6 pops out on the front panel 1a of the image reproducing apparatus 1 (Step #125). Then, the legend "FILM" is extinguished (Step #127) and the film detection flag FIF is reset to "0" (Step #129), making it possible to remove the film cartridge KT from the cartridge table 6.

On the other hand, if the judgment result in Step #111 is in the negative (NO in Step #111), the cartridge table 6 is caused to pop out (Step #131), making it possible to mount a film cartridge KT on the cartridge table 6. When a film cartridge KT is mounted on the cartridge table 6 and the eject switch 81 is pressed (YES in Step #133), the cartridge table 6 is retracted (Step #135) and the flow returns to the flowchart of FIG. 8.

Figure 12:
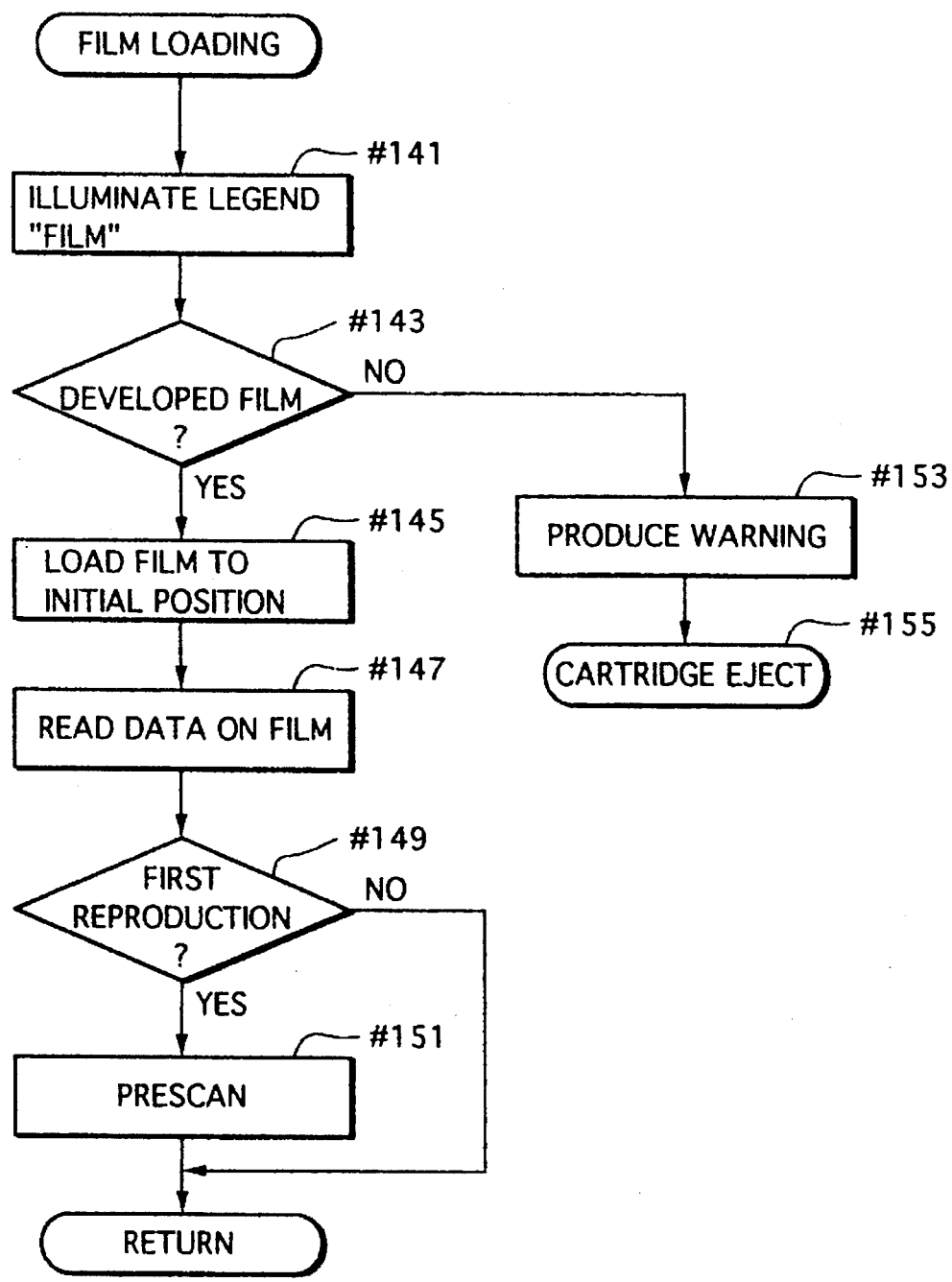
FIG. 12 is a flowchart showing a film loading subroutine.

Referring now to the flowchart of FIG. 12, the film loading subroutine of Step #51 is described below.

The legend "FILM" is illuminated in the display region 71 of the display section 7 (Step #141) and then it is judged whether the film 4 mounted in the film loader 10 is an already developed one (Step #113). The film cartridge KT carries a tab or an appropriate marking to indicate whether the film 4 has already been developed or not. The judgment in Step #143 is made by detecting such a tab or marking with an unillustrated detecting device.

If the film 4 is already developed (YES in Step #143), it is fed from the film cartridge KT until the first frame is aligned with the image sensing area SR of the image pickup device 100e as the frame position detector 104 detects the perforation at the frame (Step #145). While the first frame is being positioned, the information reader/writer 101 reads from the magnetic track 41 such information as to whether the film 4 has ever been "prescanned" (Step #147). It is to be noted here that this kind of information is written on the magnetic track 41 just in a leading portion of the film 4 (or on an IC card) when a prescan subroutine to be described later is executed.

If it is judged that the film 4 is reproduced for the first time based on the information read from the magnetic track 41 in the leading portion or the film 4 (YES in Step #149), the prescan subroutine shown FIG. 13 is executed (Step #151). Then, the flow returns to the flowchart of FIG. 8. If it is judged that the film 4 was already reproduced before (NO in Step #149), the flow skips the prescan subroutine and returns to the flowchart of FIG. 8.

If the film 4 is found to be an undeveloped film (NO in Step #143), an audible warning is produced by a buzzer (unillustrated) or a visual warning is given on the display section 7 (Step #153) since the film 4 can not be reprosect In this case, the flow skips to the beginning of the cartridge eject subroutine (Step #155) and, upon completion of the cartridge eject subroutine, returns to the flowchart of FIG. 8.

Referring now to the flowcharts of FIGS. 13A and 13B, the prescan subroutine of Step #151 is described below. After an INTA interrupt is permitted in Step #161, the legend "PRESCAN" is illuminated in the display region 71 of the display section 7 (Step #163) and the film transport 102 starts feeding the film 4 (Step #165). Next, the image pickup device 100e picks up images from individual frames for multi-frame display (Step #167) and the information reader/writer 101 reads the photographic information and other data recorded on the magnetic track 41 on the film 4 (Step #169). The image signals derived from the individual frames are processed and compressed by the first image processor 11 and stored in the image memory 14 via the presentation controller 12 (Steps #171 and #173). A principle reason for compressing the image signals is to reduce the amount of data to speed up data processing needed for multi-frame display.

In Step #175 it is judged whether a register MOR to be described later is set to "11". If the full automatic mode is selected by the mode switch 84 causing the register MOR to be set to "11" (YES in Step #175), the image reproducing manner for the prescan mode, that is, the multi-frame display, is automatically selected (Step #177). On the contrary, if the full automatic mode is not selected and the register MOR is set to other than "11" (NO in Step #175), Step #177 is skipped and the flow proceeds to Step #179. The images picked up from the individual frames are displayed in multi-frame display formal on the screen 3 of the TV monitor 2 together with the corresponding frame numbers obtained from frame data read from the magnetic track 41 on the film 4 (Steps #179 and #181).

Next, it is judged whether all the frames recorded on the film 4 have already been displayed on the multi-frame screen (Step #183). If the judgment result is in the negative (NO in Step #183), the flow returns to Step #165, from where Steps #165 through #181 are repeated until all the frame are displayed on the multi-frame screen. When all the frames have been displayed (YES in Step #183), the film transport 102 is stopped and the legend "PRESCAN" in the display region 71 is extinguished (Steps #185 and #187).

In Step #189 it is judged whether any frame number specifying a frame to be rotated has been entered through the data input device 19. If the judgement result is in the affirmative (YES in Step #189), the image corresponding to the specified frame number is circumscribed on the multi-frame screen (Step #191). Next, it is judged whether the rotation switch 85 is in an ON state (Step #193). If it is ON (YES in Step #193), the image corresponding to the specified frame number is rotated by 90 degrees and an image rotation instruction for the frame is stored in the information reader/writer 101 (Steps #195 and #197). The image rotation instruction thus stored is used in later reproduction for automatically rotating the relevant image. The flow then returns to Step #189 and it is judged if another frame number has been entered through the data input device 19.

If the rotation switch 85 is OFF in Step #193, it is further judged whether the delete switch 86 is in an ON state (Step #199). If the judgment result is in the affirmative (YES in Step #199), the on-screen image corresponding to the frame number specified with the delete switch 86 is erased and an image erasure instruction for the specified frame is stored in the information reader/writer 101 (Steps #201 and #203). The image erasure instruction thus stored is used in later reproduction for automatically omitting the relevant image. The flow then returns to Step #189 to repeat the foregoing procedure.

On the other hand, if no frame number is entered in Step #189, it is judged whether the program mode has been selected in a mode processing subroutine to be described later (Step #205). If the program mode is not selected (NO in Step #205), it is further judged whether the program switch 83 is in an ON state (Step #207). If it is ON (YES in Step #207), the legend "PROGRAM" flashes in the display region 71 of the display section 7 (Step #209).

Further, it is judged whether any frame number has been entered (Step #211). If the judgment result is in the affirmative (YES in Step #211), the image corresponding to the specified frame number is circumscribed on the multi-frame screen (Step #213). Then, the mode processing subroutine to be described later is executed (Step #215) and the position to be taken by the specified frame in a sequential arrangement in which frames are reproduced is stored in the information reader/writer 101 (Step #217). The sequential arrangement information thus stored is used at a later time for reproducing individual images in the right order.

Proceeding to Step #219, it is judged whether the program switch 83 has been turned on. If it is OFF (NO in Step #219), the flow returns to Step #211, from where operations of Steps #211 through #217 are repeated until the program switch 83 is turned on. When the program switch 83 has eventually been turned on (YES in Step #219), the fact that the program mode has been selected is memorized and the legend "PROGRAM" is illuminated continuously (Steps #221 and #223). On the other hand, if the program switch 83 is OFF in Step #207, Steps #209 through #223 are skipped and the judgment is made in Step #225 as to whether the power switch 80 is in an ON slate. If the power switch 80 is OFF (NO in Step #225), the flow proceeds to Step #227 where the initializing subroutine to described in FIG. 7 is executed.

If the power switch 80 is NO in Step #225, it is further judged in Step #229 whether the reproduction switch 91 has been turned on. If the reproduction switch 91 is ON (YES in Step #229), the film transport 102 is driven to rewind the film 4 back to the film cartridge KT (Step #231) and data stored in the information reader/writer 101 is written onto the magnetic track 41 on the film 4 (Step #233). Then, it is judged in Step #235 whether the film 4 has been completely rewound.

The flow is looped back to repeat Steps #231 through #235 until the film 4 is completely rewound, and once the judgment result in Step #235 is in the affirmative, the film transport 102 is stopped (Step #237) and an image reproduction subroutine (Step #239) to be described later is executed.

On the other hand, if the reproduction switch 91 is OFF in Step #229, the flow returns to Step #189, in this case, if no frame number is entered (NO in Step #189), the flow proceeds to Step #205. At this time, if the program mode has been selected in the aforementioned Step #221, the judgment result in Step #205 becomes YES and the flow proceeds to Step #241.

In Step #241 it is judged whether the program switch 83 has been turned on. If it is ON (YES in Step #241), programmed data contents are reset (Step #243) and the legend "PROGRAM" is extinguished (Step #245). If the program switch 83 is OFF (NO in Step #243), the flow skips Steps #243 and #245 and proceeds to Step #225.

Described above is the procedure for setting the sequential arrangement for reproducing individual frames as well as rotation and omission of particular images. Such information is written on the magnetic track 41 on the film 4 and read out at a later time making it possible to reproduce the images according to the programmed presentation.

Referring now to the flowchart of FIG. 14, the mode processing subroutine of Step #215 is described below. The mode processing subroutine allows the user to set or program image reproduction and sound generating manners in a chosen edit mode. Edit mode selection is controlled by the register MOR. It is set to "00" in the random operating mode, "01" in the manual mode, "10" in the semiautomatic mode and "11" in the full automatic mode.

First, it is judged in Step #251 whether or not the register MOR, is set to "11" or "00". If the judgment result is in the affirmative, the current selection is the full automatic mode or random operating mode. In this case, the flow escapes the mode processing subroutine and returns to the flowchart of FIG. 13B.

If the judgment result in Step #251 is in the negative, the flow proceeds to Steps #253, where it is judged whether the register MOR is set to "01". If it is set to "01" (YES in Step #253), the current selection is the manual mode. In this case, it is judged whether the select switch 96 is in an ON state (Step #255). If it is ON (YES in Step #255), the central processor 22 waits until image reproduction manners are programmed by operating such switches as the zoom-in switch 93 and zoom-out switch 94 (Step #257). When image reproduction manners have been programmed (YES in Step #257), they are stored in the internal memory of the information reader/writer 101 or on the magnetic track 41 on the film 4 (Step #259).

Figure 13A:
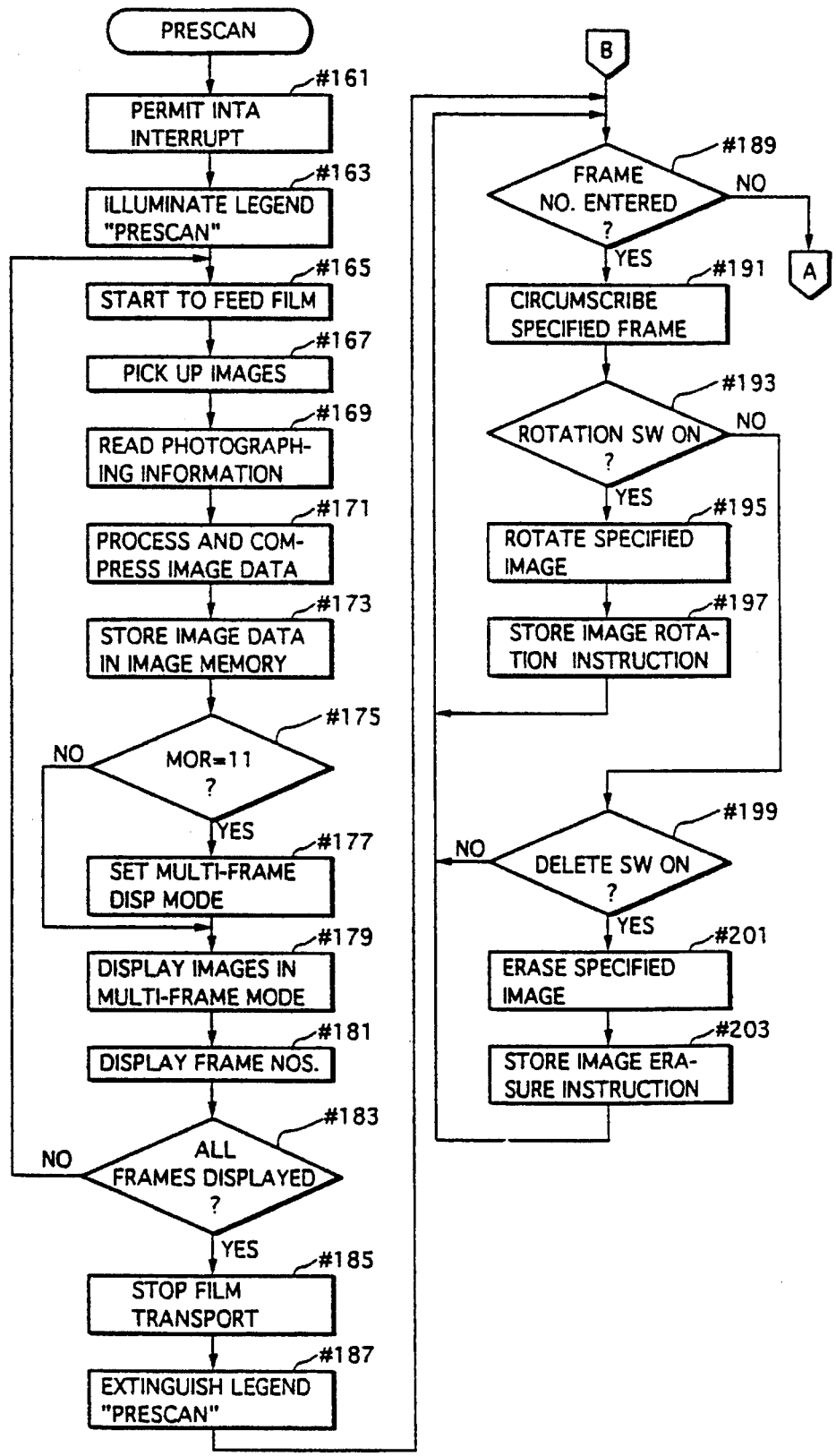
FIGS. 13A and 13B are flowcharts combinedly showing a prescan subroutine.
Figure 13B:
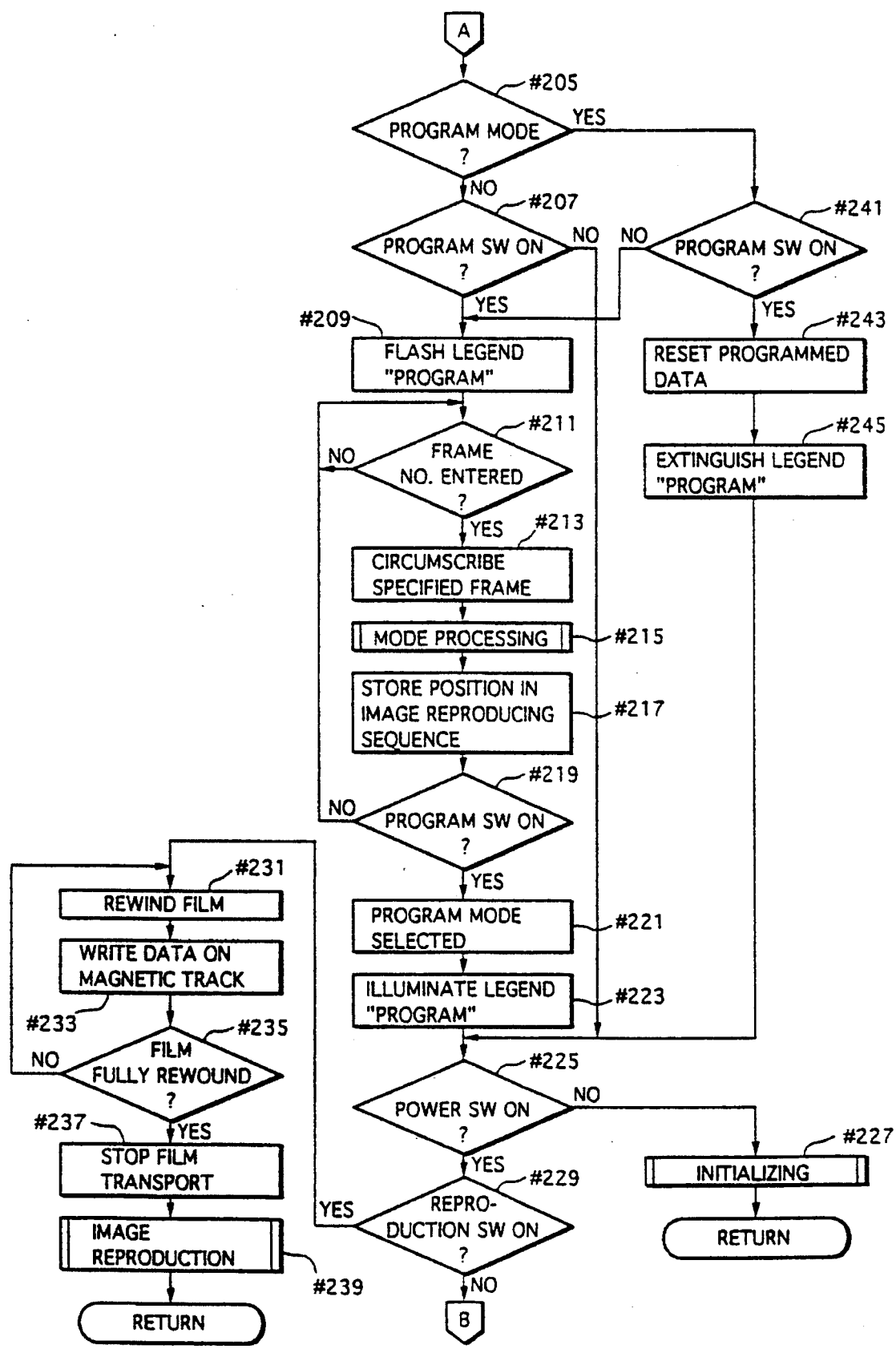

In order to match the time during which music is played with the time during which individual images are reproduced, it is judged in Step #261 whether image reproduction manners have been programmed for all the frames specified in the flowchart of FIGS. 13A and 13B. If image reproduction manners have not been programmed yet for all the specified frames (NO in Step #261), background music is not programmed and the flow returns to the flowchart of FIGS. 13A and 13B.

If, however, image reproduction manners have already been programmed for all the specified frames (YES in Step #261), the central processor 22 waits until background music is programmed by operating the data input device 19 or else (Step #263). When background music has been programmed (YES in Step #263), it is stored in the internal memory of the information reader/writer 101 or on the magnetic track 41 on the film 4 (Step #265). Background music may be selected from those stored in the music storage medium MB or injected from the external audio input terminal 200.

On the other hand, if the register MOR is set to "10" (NO in Step #253), the current edit mode selection is the semiautomatic mode. In this case, it is judged whether the select switch 96 is in an ON state (Step #267). If it is ON (YES in Step #267), the central processor 22 waits until image reproduction manners are manually programmed by the user (Step #269). When image reproduction manners have been programmed (YES in Step #269), they are stored in the internal memory of the information reader/writer 101 or on the magnetic track 41 on the film 4 (Step #271).

If image reproduction manners have not been programmed yet all the specified frames (NO in Step #273), background music is not programmed and the flow returns to the flowchart of FIGS. 13A and 13B. Contrarily, if image reproduction manners have already been programmed for all the specified frames (YES in Step #273), background music suited for the image reproduction manners is automatically selected from those stored in the music storage medium MB (Step #275) and music generating information is stored in the internal memory of the information reader/writer 101 or on the magnetic track 41 on the film 4 (Step #277).

On the other hand, if the select switch 96 is OFF in Step #267, background music might have been chosen to be programmed manually. In this case, the central processor 22 waits until background music is programmed by operating the data input device 19 or else (Step #279). When background music has been programmed (YES in Step #279), an image reproduction manner suited for the background music is automatically programmed (Step #281) and the music generating information is stored in the internal memory of the information reader/writer 101 or on the magnetic track 41 on the film 4 (Step #283).

Referring to the flowchart of FIG. 15, described below is the MFI interrupt subroutine which is executed when the mode switch 84, rewind switch 88, stop switch 89, pause switch 90, reproduction switch 91 or fast forward switch 92. When the mode switch 84 is set to an ON state (YES in Step #291), a mode select subroutine (Step #293) to be described later is executed and the INTA interrupt is permitted (Step #295).

Similarly, when the fast forward switch 92 is set to an ON state (YES in Step #297), a fast forward subroutine (Step #299) to be described later is executed. When the rewind switch 88 is set to an ON state (YES in Step #301), a film rewinding subroutine (Step #303) to be described later is executed. When the reproduction switch 91 is set to an ON state (YES in Step #305), the image reproduction subroutine (Step #307) to be described later is executed. When the pause switch 90 is set to an ON state (YES in Step #309), a pause subroutine (Step #311) to be described later is executed. When the stop switch 89 is to an ON state (YES in Step #313), a stop subroutine (Step #315) to be described later is executed.

Figure 16:
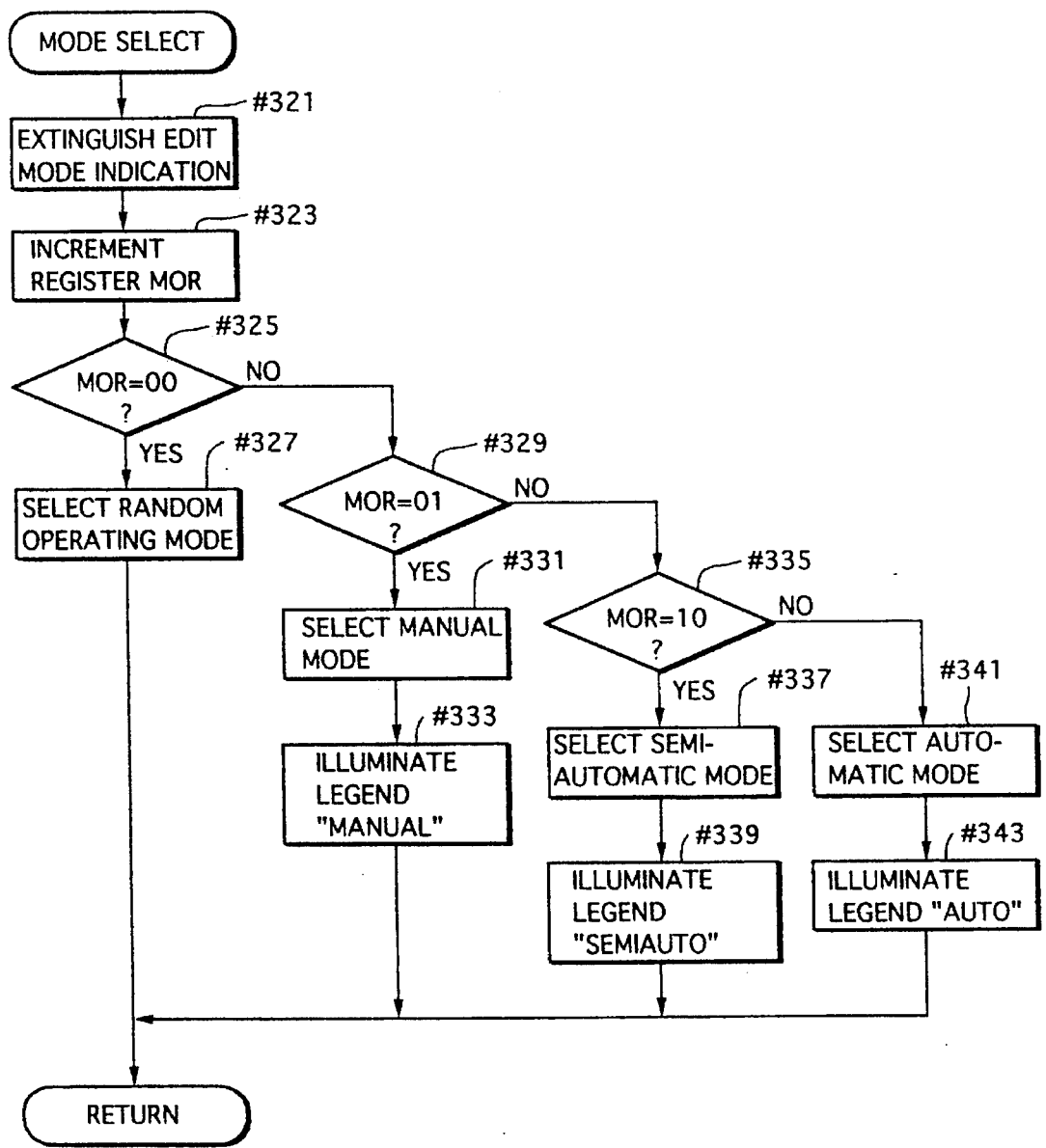
FIG. 16 is a flowchart showing a mode select subroutine.

Referring now to the flowchart of FIG. 16, the mode select subroutine of Step #293 is described below.

First, the legend "MANUAL", "SEMI AUTO" or "AUTO" whichever illuminated in the display region 71 of the display section 7 indicating the currently selected edit mode is extinguished (Step #321) and the state of the register MOR is incremented (Step #323). If the register MOR assumes a "00" slate as a result of increment (YES in Step #325). The random operating mode is selected (Step #327) allowing manual control of image reproduction and music or sound source selection.

On the other hand, if the register MOR assumes a "01" state as a result of increment (YES in Step #329), the manual mode is selected (Step #331) and the legend "MANUAL" is illuminated in the display region 71 of the display section 7 (Step #333). In consequence, the user can manually program image reproduction manner and background music, and the images are reproduced with background music according to the programmed presentation.

If the register MOR assumes a "10" state as a result of increment (YES Step #335), the semi automatic mode is selected (Step #337) and the legend "SEMIAUTO" is illuminated in the display region 71 of the display section 7 (step #339). In this case, the user can manually program either an image reproduction manner or background music. If the judgment result in Step #335 is in the negative (NO in Step #335), the current state of the register MOR is "11". In this case, the full automatic mode is selected (Step #341) and the legend "AUTO" is illuminated in the display region 71 of the display section 7 (Step #343). Then, both the image reproduction manner and background music are programmed automatically.

As seen above, the random operating mode, manual mode, semiautomatic mode and full automatic mode can be cyclically switched by pressing the mode switch 84. A desired mode may be selected depending on the purpose of presentation or the user's preference. For instance, if the user wishes to watch each frame at leisure, the random operating mode would be the right choice. If it is desired to program an image reproduction manner and background music to the preference of particular users, the manual mode would be the best. The semiautomatic mode is to be selected if the user wishes to program an image reproduction manner or background music to the preference of users. If the user opts for fully automatic programming of both manners, then his choice should be the full automatic mode.

Referring now to the flowcharts of FIGS. 17A and 17B, the fast forward subroutine of Step #299 is described below.

After the INTA interrupt is permitted in Step #351, it is judged in Step #353 whether the film transport 102 is currently transporting the film 4. If the film 4 being transported (YES in Step #353), the flow proceeds to Step #355, where the film transport 102 is stopped.

Next, it is judged whether an image reproducing operation is currently in progress (Step #357). If the judgment result is in the affirmative (YES in Step #357), the film transport 102 is set to take up the film 4 by one frame in the fast forward mode (Step #359) and a fast forward mode indication is illuminated in the display region 73 of the display section 7 (Step #361).

The central processor 22 waits until the film 4 is taken up one frame forward in Step #363. When the film 4 has been taken up by one frame (YES in Step #363), the film transport 102 is stopped (Step #365) and the fast forward mode indication in the display region 73 is extinguished (Step #367). Thereafter, the image reproduction subroutine to be described later is executed in Step #369.

On the other hand, if no image is being reproduced in Step #357), it is further judged in Step #371 whether any data is being written on the magnetic track 41 on the film 4. If the judgment result is in the affirmative (YES in Step #371), the central processor 22 waits until the data writing process is completed (Step #373). When it has been completed (YES in Step #373), an unillustrated timer T for detecting lapse of a preset time is once reset and started (Step #375) and the fast forward mode indication is flashed in the display region 73 (Step #377). If no data is being written in Step #371, the flow immediately proceeds to Step #375.

In Step #379 it is judged whether the timer T has already counted the preset time. If the timer T is still counting (NO in Step #379), it is further judged in Step #381 whether any frame number has been entered. If no frame number has been entered (NO in Step #381 ), the flow returns to Step #377 and the looping process including Steps #377. #379 and #381 is cycled until the timer T counts up to the end of the preset time or a frame number is entered.

When a frame number is entered while the timer T is counting (YES in Step #381), the frame number is stored in the internal memory of the central processor 22 (Step #383) and indicated in the display region 74 of the display section 7 (Step #385), and a film feeding amount K to bring the specified frame to the image sensing position is calculated (Step #387). If no frame number is entered before the timer T counts up to the end of the preset time (YES in Step #397), the flow advances to Step #389 without proceeding to Steps #383 to #387.

In Step #389 the fast forward mode indication is illuminated in the display region 73. Then, the film transport 102 is set to transport the film in order to bring the specified frame to the image sensing position (Step #391). While the film 4 is being transported, the actual film feeding amount is measured based on the number of rotations of the drive motor of the film transport 102, for example (Step #393).

In Step #395 it is judged whether the actual film feeding amount has reached the required film feeding amount K. If the judgment result is in the negative (NO in Step #395), it is further judged in Step #397 whether the film 4 has been supplied up to its last frame (or film end). If the film 4 has not been supplied up to the film end (NO in Step #397), it is further judged whether the INTA interrupt has been requested by pressing the stop switch 89, reproduction switch 91 or else (Step #399). If the INTA interrupt has been requested (YES in Step #399), the flow returns to the INTA interrupt subroutine of FIG. 15. If the INTA interrupt has not been requested (NO in Step #399), the flow returns to Step #395.

On the other hand, when the actual film feeding amount has reached the required film feeding amount K (YES in Step #395), the film transport 102 is stopped (Step #401) and the fast forward mode indication in the display region 73 is extinguished (Step #403). Thereafter, the image reproduction subroutine to be described later is executed in Step #405.

If the film 4 has been supplied up to the film end in Step #397, the film transport 102 is stopped (Step #407) and the fast forward mode indication the display region 73 is extinguished (Step #409). Thereafter, the film rewinding subroutine to be described later is executed in Step #411.

Referring now to the flowcharts of FIGS. 18A and 18B, the film rewinding subroutine of Step #303 is described below.

After the INTA interrupt is permitted in Step #421, it is judged in Step #423 whether the film 4 has been supplied up to the film end. If the film 4 has already been supplied up to the film end (YES in Step #423), a rewind mode indication is illuminated in the display region 73 of the display section 7 indicating that the film rewind mode has been activated (Step #425) and the film transport 102 is set to rewind the film 4 (Step #427). Then, it is further judged whether the INTA interrupt has been requested by pressing the stop switch 89 or else (Step #429). When the INTA interrupt has been requested (YES in Step #429), the flow returns to the INTA interrupt subroutine of FIG. 15.

On the other hand, if the film 4 has not been supplied up to the film end (NO in Step #423), it is further judged in Step #431 whether the film 4 is currently being transported. If the film 4 is being transported (YES in Step #431), the flow proceeds to Step #433, where the film transport 102 is stopped. If the film transport 102 is not transporting the film 4 (NO in Step #431), the flow skips Step #433 and proceeds to Step #435.

In Step #435 it is judged whether an image reproducing operation is currently progress. If the judgment result is in the affirmative (YES in Step #435), the film transport 102 is set to rewind the film 4 one frame backward (Step #437) and the rewind mode indication is illuminated in the display region 73 of the display section 7 (Step #439). When the film 4 has been rewound by one frame (YES in Step #441), the film transport 102 is stopped (Step #443) and the rewind mode indication in the display region 73 is extinguished (Step #445). Thereafter, the image reproduction subroutine to be described later is executed in Step #447.

On the other hand, if no image is being reproduced in Step #435, it is further judged in Step #449 whether any data is being written on the magnetic track 41 on the film 4. If the judgment result is in the affirmative (YES in Step #449), the central processor 22 waits until the data writing process is completed (Step #451). When it has been completed (YES in Step #451), the timer T is once reset and started (Step #453) and the rewind mode indication is flashed in the display region 73 (Step #455).

In Step #457 it is judged whether the timer T has already counted the preset time. If the timer T is still counting (NO in Step #457), it is further judged in Step #459 whether any frame number has been entered. If no frame number has been entered (NO in Step #459), the flow returns to Step #455 and the looping process including Steps #455, #457 and #459 is cycled until the timer T counts up to the end of the preset time or a frame number is entered.

When a frame number is entered while the timer T is counting (YES in Step #459), the frame number is stored in the internal memory of the central processor 22 (Step #461) and indicated in the display region 74 of the display section 7 (Step #463), and a film feeding amount K to bring the specified frame to the image sensing position is calculated (Step #465). If no frame number is entered before the timer T counts up to the end of the preset time (YES in Step #457), the flow advances to Step #467.

In Step #467 the rewind mode indication is illuminated in the display region 73. Then, the film transport 102 is set to rewind the film 4 in order to bring the specified frame to the image sensing position (Step #469). While the film 4 is being rewound, the actual film feeding amount is measured based on the number of rotations of the drive motor of the film transport 102, for example (Step #471).

In Step #473 it is judged whether the actual film feeding amount has reached the required film feeding amount K. If the judgment result is in the negative (NO in Step #473), it is further judged in Step #475 whether the film 4 has been rewound back to film cartridge KT just leaving the leading portion. If the film 4 has not been rewound back to the film cartridge KT (NO in Step #475), it is further judged whether the INTA interrupt has been requested by pressing the stop switch 89 or else (Step #477). If the INTA interrupt has been requested (YES in Step #477), the flow returns to the INTA interrupt subroutine of FIG. 15. If the INTA interrupt has not been requested (NO in Step #477), the flow returns to Step #473.

On the other hand, when the actual film feeding amount has reached the required film feeding amount K (YES in step #473), the film transport 102 is stopped (Step #479) and the rewind mode indication in the display region 73 is extinguished (Step #481). Thereafter, the image reproduction subroutine to be described later is executed in Step #483.

If the film 4 has been rewound back to the film cartridge KT just leaving the leading portion in Step #475, the image reproducing apparatus 1 writes such information that the film 4 was once reproduced as well as the information about background music and image color corrections on the magnetic track 41 just in the leading portion of the film 4 (or on a separate memory medium contained in the film cartridge KT) (Step #485). Subsequently, the film transport 102 is stopped (Step #487) and the rewind mode indication in the display region 73 is extinguished (Step #489). Thereafter, the initializing subroutine described FIG. 7 is executed in Step #491.

Referring now to the flowcharts of FIGS. 19A and 19B, the image reproduction subroutine of Step #307 is described below.

First, it is judged in Step #501 whether the film transport 102 is currently transporting the film 4. If the judgment result is in the affirmative (YES in Step #501), the film transport 102 is stopped in Step #503. If the judgment result is in the negative (NO in Step #501), the flow skips Step #503 and proceeds to Step #505. In step #505 it is judged whether any frame of the film 4 is aligned with the image sensing area SR of the image pickup device 100e based on perforation detection results. If no frame of the film 4 is aligned with the image sensing area SR (NO in Step #505), a frame positioning subroutine to be described later is executed to align the frame KM with the image sensing area SR (Step #507). If a frame is aligned with the image sensing area SR (YES in Step #505), a frame positioning subroutine of Step #507 is skipped.

Figure 14:
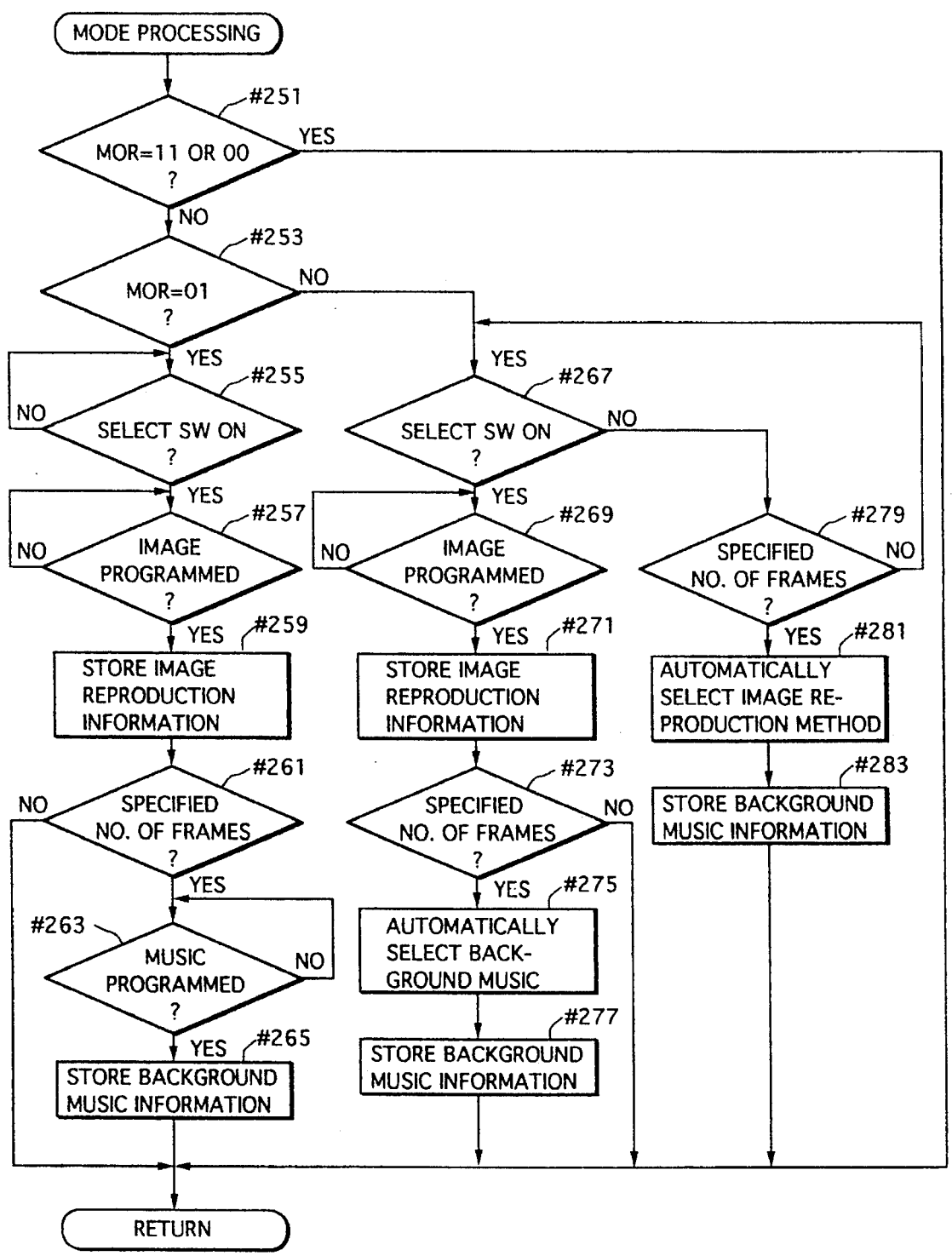
FIG. 14 is a flowchart showing a mode processing subroutine.

In Step #509 it is judged whether the program mode was selected in the prescan subroutine of FIG. 13 and 14. If the program mode was selected (YES in Step #509), the number of the frame to be reproduced first in the manner programmed in the aforementioned prescan subroutine is read from the internal memory of the central processor 22 (Step #511).

Then, the film transport 102 is set to transport the film 4 in order to bring the frame to be reproduced up to the image sensing position (Step #513). The film 4 is transported until the frame is aligned with the image sensing area SR of the image pickup device 100e (YES in Step #515) and the relevant frame number is indicated in the display region 74 of the display section 7 (Step #517).

On the other hand, if the program mode was not selected (NO in Step #509), the flow skips Steps #511 through #517 and proceeds to Step #519 in order to reproduce images starting from the currently aligned frame.

In Step #519 it is judged whether the register MOR is set to "00". If it is set to "00" indicating that the random operating mode is selected (YES in Step #519), the INTA interrupt is prohibited in Step #521. Subsequently, data on the currently specified frame is read from the magnetic track 41 on the film 4 (Step #523). An image is picked up from the frame simultaneously or after the reading of data from the magnetic track 41 (Step #525), and the image is processed by the first image processor 11 and stored in the image memory 13 via the presentation controller 12 (Step #527).

Here, the INTA interrupt is permitted again (Step #529) and a reproduction status switching subroutine to be described later is executed (Step #531). At this time, a looping process including Steps #531 and #533 is cycled until the INTA interrupt is requested by pressing the stop switch 89 or else. When the INTA interrupt is requested (YES in Step #533), the flow returns to the INTA interrupt subroutine of FIG. 15.

If the register MOR is set to other than "00" in Step #519, the INTA interrupt is prohibited in Step #535. Subsequently, data on the currently specified frame is read from the magnetic track 41 on the film 4 (Step #537). An image is picked up from the frame simultaneously or after the reading of data from the magnetic track 41 (Step #539), and image data is processed by the first image processor 11 and stored in the image memory 13 via the presentation controller 12 (Step #541).

Next, it is judged in Step #543 whether the register MOR is set to "11". If it is set to "11" indicating that the full automatic mode is selected (YES in Step #543), it is further judged whether the program mode is selected (Step #545). If the program mode is selected (YES in Step #545), the presentation programmed in the prescan subroutine is altered (Step #547). The reason why the presentation is altered is as follows. In the full automatic mode, an image reproduction manner and background music automatically determined depending on the number of frames on the film 4. However, if the program mode is selected, the number of frames to be reproduced is determined by the settings entered in the prescan subroutine. Therefore, if the image reproduction manner is determined based on the number of frames available on the film 4, music playing time may happen to exceed image reproduction time. To avoid this inconvenience, the presentation is altered to extend the image reproduction time depending on the number of frames to be reproduced, for example, the case that the program mode is selected in the full automatic mode.

On the other hand, if the register MOR is set to other than "11" in Step #543 or the program mode is not selected in Step #545, the flow skips Step #547 and proceeds to Step #549. The INTA interrupt is permitted again in Step #549 and the background music programmed in the mode processing subroutine of FIG. 14 is started in Step #551.

Further, the image stored in the image memory 13 is reproduced in Step #553 according to a specified presentation until the image reproduction is finished (YES in Step #555). In Step #557 it is judged whether the program mode is selected. If the program mode is selected (YES in Step #557), the flow returns to Step #511, where the number of the frame to be reproduced next is read from the internal memory of the central processor 22.

If the program mode is no selected in Step #557, it is further judged in Step #559 whether presentation of all the frames to be reproduced has been finished. If there still remains any frame to be reproduced (NO in Step #559), the film 4 is transported until the next frame is aligned with the image sensing area SR of the image pickup device 100e based on perforation detection results (Step #561).

On the other hand, if presentation of all the frames to be reproduced has been finished (YES in Step #559), the music is stopped and the aforementioned film rewinding subroutine is executed (Steps #563 and #565).

As seen above, individual images on the film 4 are picked up after each frame is aligned with the image sensing area SR of the image pickup device 100e. This arrangement makes it possible to prevent such inconveniences that a frame border appears on the screen 3 of the TV monitor 2 or a reproduced image is partially cut away, eventually providing successful image reproduction.

Although the above image reproduction subroutine has described a process of altering the presentation (Step #547) if the full automatic mode is selected, the subroutine can be modified in such a way as to enable alteration of the presentation if background music is manually selected in the semiautomatic mode.

Referring now to the flowchart of FIG. 20, the frame positioning subroutine of Step #507 is described below. It is assumed in the following description that the film 4 is supplied from the film cartridge KT when the drive motor of the film transport 102 rotates in its forward direction and rewound back to the film cartridge KT when the drive motor rotates in its reverse direction.

First, it is judged in Step #571 whether the optical sensing device of the frame position detector 104 is receiving light from the light-emitting device through a perforation in the film 4. For instance, if the optical sensing device P1 is receiving light from the light-emitting device P2 as shown in FIG. 4 (YES in Step #571), a frame is already aligned with the image sensing area SR. In this case, the flow skips Steps #573 through #581 and returns to the flowcharts of FIGS. 19A and 19B.

If the optical sensing device P1 is not receiving light from the light-emitting device P2 (NO in Step #571 ), it is judged in Step #573 whether the reproduction switch 91 was turned on while the drive motor of the film transport 102 was rotating in the forward direction. If the reproduction switch 91 was turned on during reverse rotation of the drive motor (NO in Step #573), the drive motor is switched to forward rotation to feed the film 4 out of the film cartridge KT (Step #575). Contrarily, if the reproduction switch 91 was turned on during forward rotation of the drive motor (YES in Step #573), the drive motor is left rotating in the forward direction feeding the film 4 out of the film cartridge KT (Step #577).

In Step #579 it is judged whether the optical sensing device P1 is receiving light from the light-emitting device P2 through a perforation in the film 4. If the optical sensing device 171 is not receiving light from the light-emitting device P2 yet (NO in Step #579), the flow returns to Step #573 to forward feed of the film 4. Contrarily, if the optical sensing device P1 is receiving light from the light-emitting device P2 (YES in Step #579), the drive motor of the film transport 102 is stopped (Step #581) and the flow returns to the flowcharts of FIGS. 19A and 19B.

Figure 20:
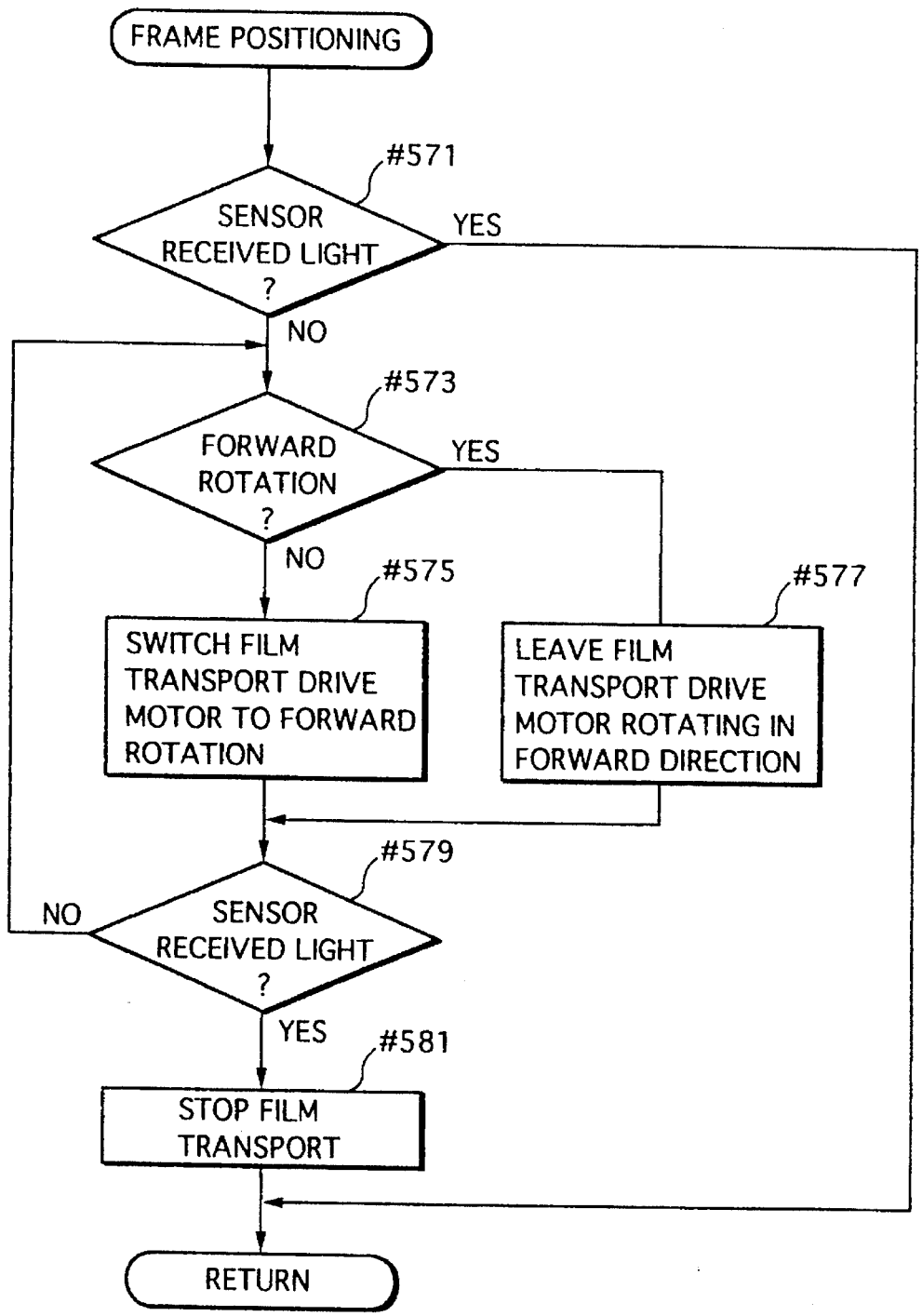
FIG. 20 is a flowchart showing a frame positioning subroutine.
Figure 21A:
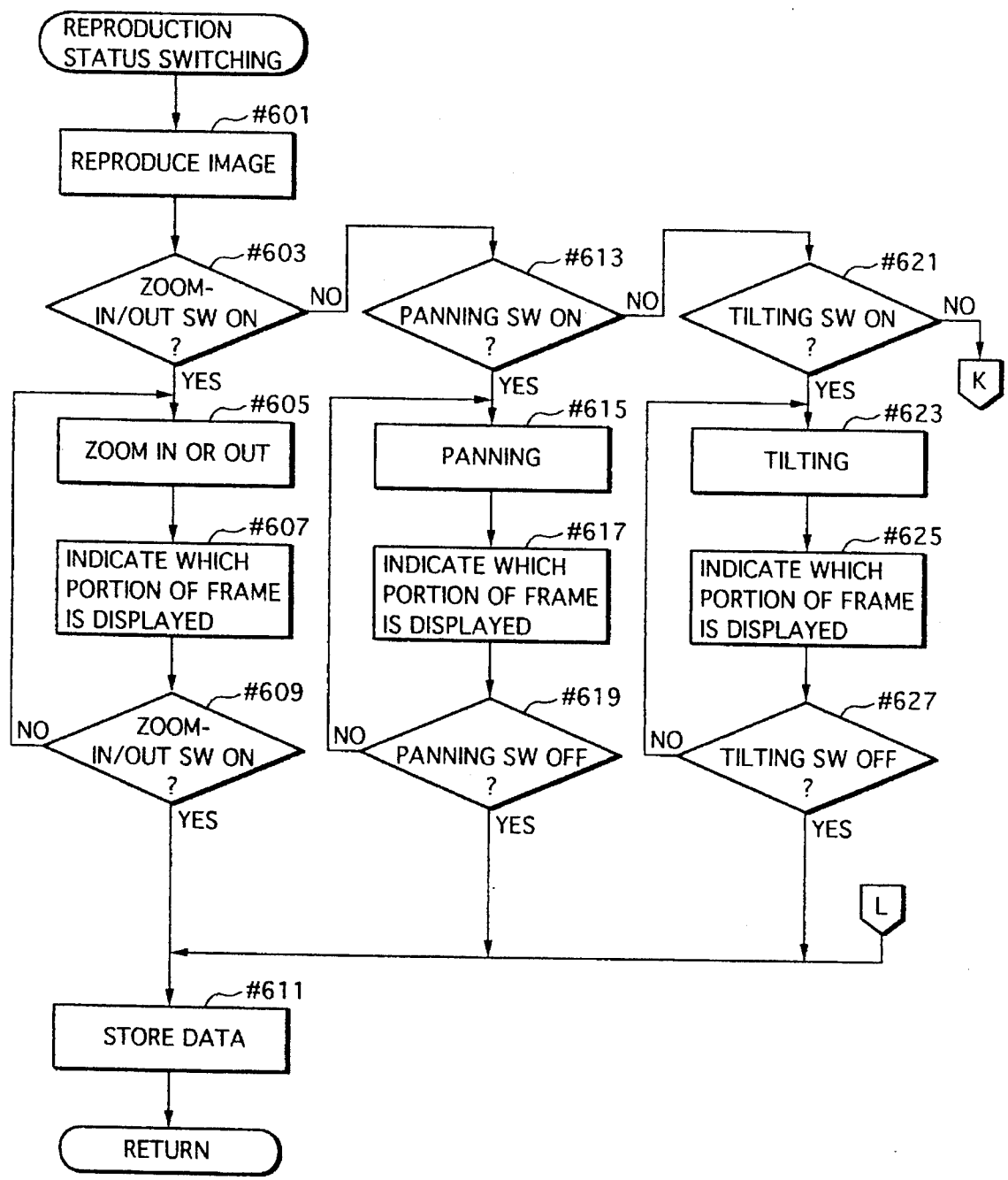
FIGS. 21A through 21D are flowcharts combinedly showing an reproduction status switching subroutine.
Figure 21B:
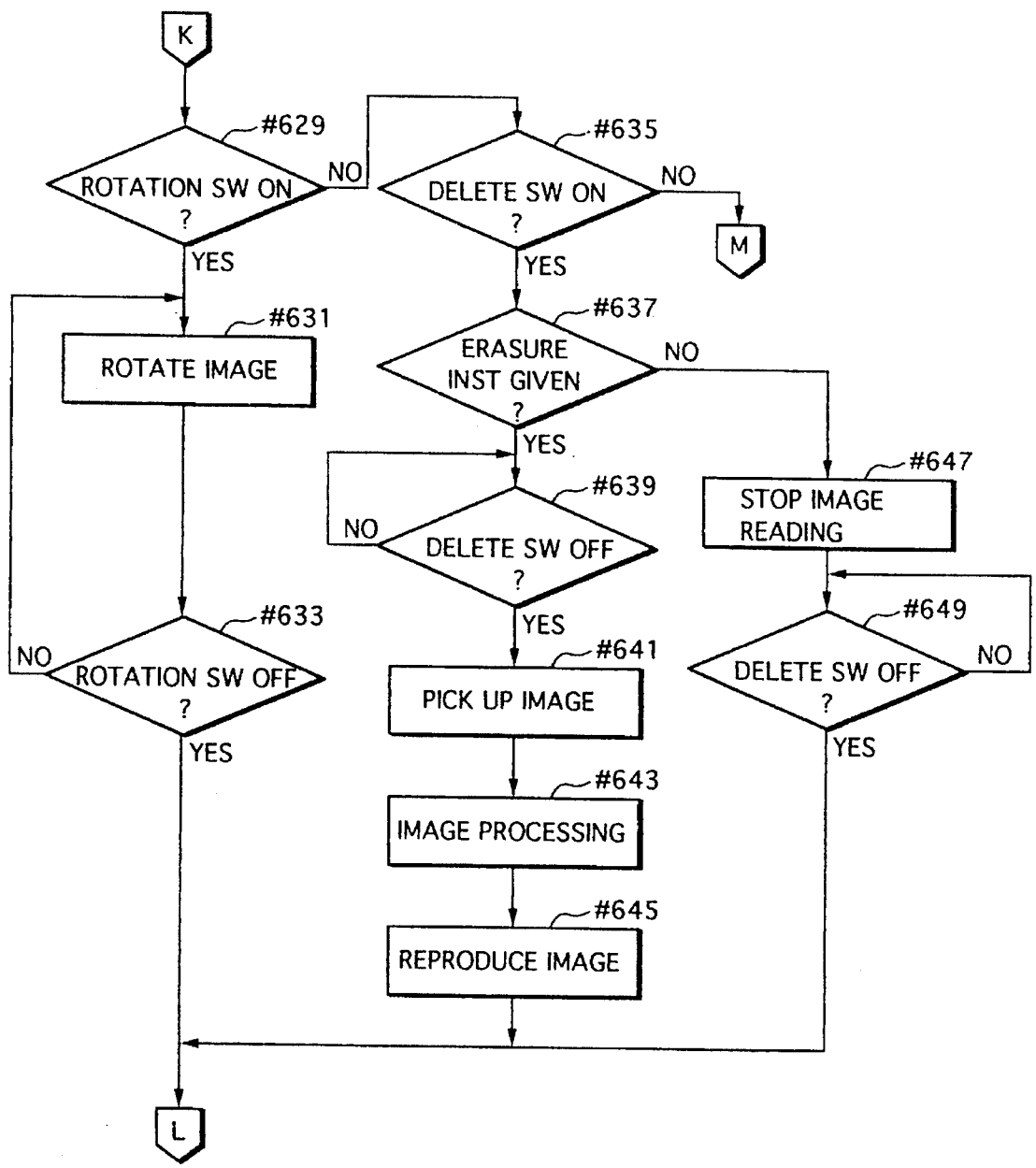
Figure 21C:
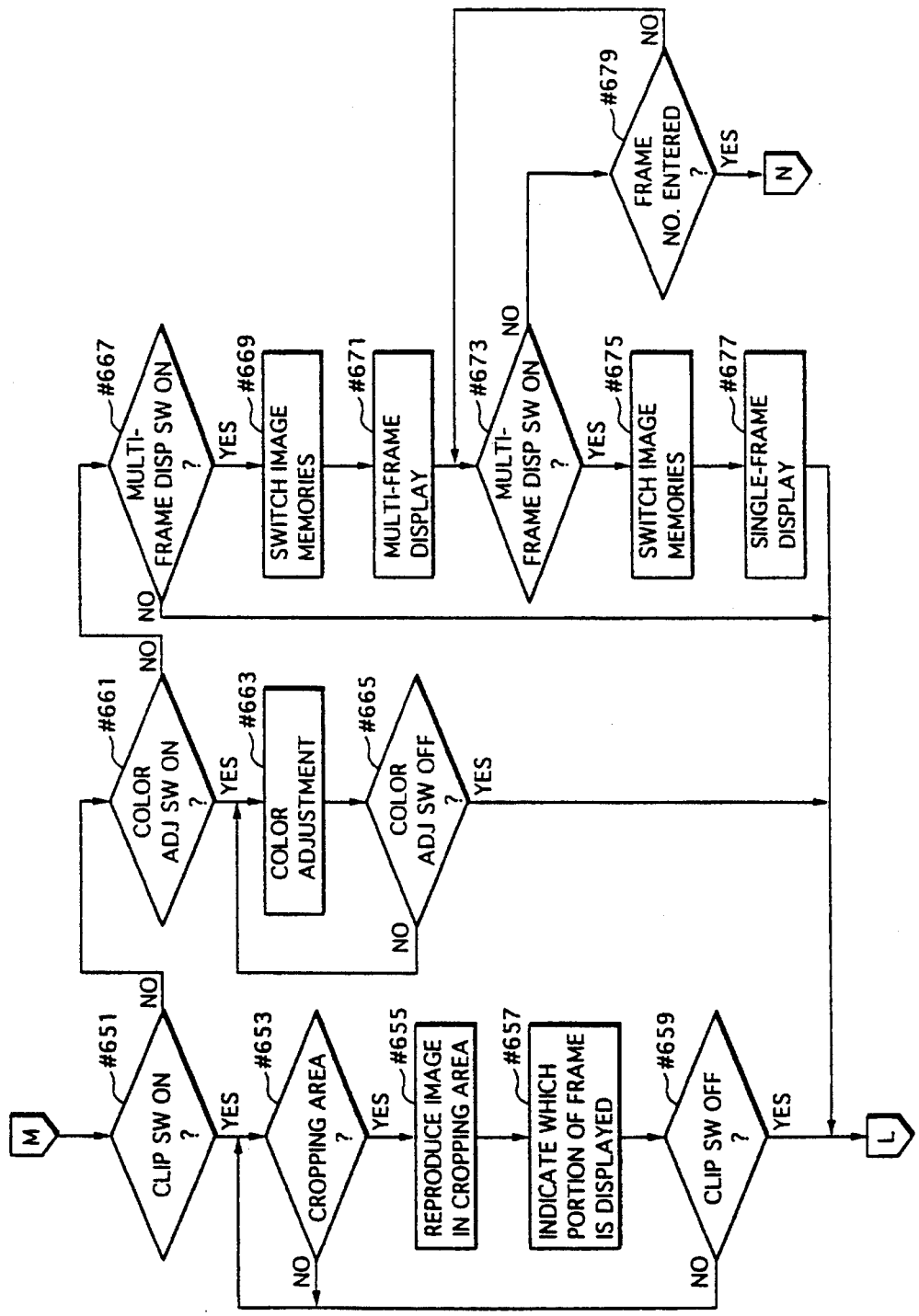
Figure 21D:
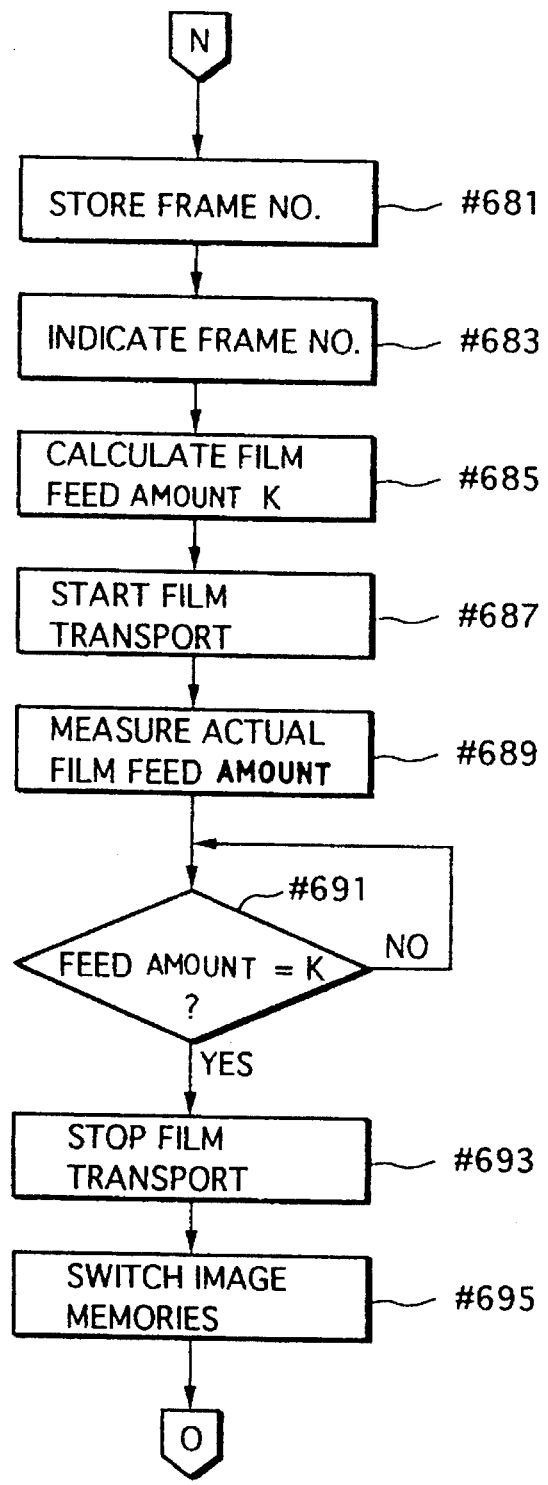

Although individual frames the film 4 are aligned with the image sensing area SR of the image pickup device 100e by means of the optical sensing device P1 and the light-emitting device P2 in FIG. 20, the arrangement for frame positioning is not limited thereto. As a modification, it may be possible to align individual frames by detecting a positioning mark put on each frame when taking a shot. As another modification, it may be possible to align individual frames based on positioning data recorded on the magnetic track 41 on the film 4.

Referring now to the flowcharts of FIGS. 21A through 21D, the reproduction status switching subroutine of Step #531 is described below.

First, the image picked up in Step #525 is reproduced (Step #601). Next, it is judged whether the zoom-in switch 93 or zoom-out switch 94 is set to an ON state (Step #603). If either switch is ON (YES in Step #603), the image pickup device 100e successively picks up enlarged or reduced images from the currently selected frame while the image magnifier 100c optically zooms in or out (Step #605). As an alternative to the optical process, zoom-in/out operations may be accomplished by the presentation controller 12 using an image processing technique. In Step #607 the display region 77 of the display section 7 indicates which portion of the frame is currently displayed on the screen 3 of the TV monitor 2.

The zooming process loops around Steps #605, #607 and #609 until both the zoom-in switch 93 and zoom-out switch 94 become OFF (YES in Step #609). Magnification data valid at a moment when both switches become OFF is stored in the internal memory of the informal ion reader/writer 101 (Step #611). The flow then returns to the flowchart of FIG. 19A. It is to be noted here that the magnification data may be recorded directly onto the magnetic track 41 on the film 4.

On the other hand, if both the zoom-in switch 93 and zoom-out switch 94 are OFF in Step #603, it is further judged in Step #613 whether the right or left panning switch 951 is in an ON state. If either panning switch 951 is ON (YES in Step #613), the currently selected frame is panned by successively picking up images enlarged by the image magnifier 100c as the film transport 102 feeds the film 4, or by way of image processing performed by the presentation controller 12 (Step #615). In Step #617 the display region 77 of the display section 7 indicates which portion of the frame is currently displayed on the screen 3 of the TV monitor 2.

The panning process loops around Steps #615, #617 and #619 until both the right and left panning switches 951 become OFF. When both of them become OFF (YES in Step #619), panning data is stored in the internal memory of the information reader/writer 101 or on the magnetic track 41 on the film 4 (Step #611).

On the other hand, it both the right and left panning switches 951 are OFF in Step #613, it is further judged in Step #621 whether the up or down tilting switch 952 is in an ON state. If either tilting switch 952 is ON (YES in Step #621), image pickup operation is successively done while the image magnifier 100c zooms in on the current frame, the image rotating device 100d rotates the image should it be a portrait shot, and unillustrated film moving means moves the film up or down to give a camera tilting effect (Step #623). Here again, the camera tilting effect may be created by the presentation controller 12 using an image processing technique. In Step #625 the display region 77 of the display section 7 indicates which portion of the frame is currently displayed on the screen 3 of the TV monitor 2.

The tilting process loops around Steps #623,#625 and #627 until both the up and down tilting switches 952 become OFF. When both of them become OFF (YES in Step #627), tilting data is stored in the internal memory of the information reader/writer 101 or on the magnetic track 41 on the film 4 (Step #611).

On the other hand, if both the up and down tilting switches 952, are OFF in Step #621, it is further judged in Step #629 whether the rotation switch 851 has been set to an ON state. If the rotation switch 85 is ON (YES in Step #629), the image on the film 4 is rotated by the image rotating device 100d, or by the presentation controller 12 using an image processing technique, before the image is picked up by the image pickup device 100e (Step #631 ). The image rotating process of Steps #631 and #633 is cycled until the rotation switch 85 becomes OFF. When the rotation switch 85 becomes OFF (YES in Step #633), image rotating data is stored in the internal memory of the information reader/writer 101 or on the magnetic track 41 on the film 4 (Step #611).

On the other hand, if the rotation switch 85 is OFF in Step #629, it is judged in Step #635 whether the delete switch 86 has been set to an ON state, if the delete switch 86 is ON (YES in Step #635), it is further judged in Step #637 whether an image erasure instruction is already given to the currently selected frame. If the judgment result is in the affirmative (YES in Step #637), it is judged that the image erasure instruction has been canceled. In this case, the image pickup device 100e picks up the image in the frame (Step #641) when the delete switch 86 is made OFF (YES in Step #639). Subsequently, the image is processed by the presentation controller 12 and reproduced on the TV monitor 2 (Steps #643 and #645). The image erasure instruction cancellation data is then stored in the internal memory of the information reader/writer 101 or on the magnetic track 41 on the film 4 (Step #611).

If the image erasure instruction is not given to the currently selected frame (NO in Step #637), image reading from the image memory 13 is interrupted (Step #647). When the delete switch 86 is made OFF (YES in Step #649), the image erasure instruction to the relevant frame is stored in the internal memory of the information reader/writer 101 or on the magnetic track 41 on the film 4 (Step #611).

On the other hand, if the delete switch 86 is OFF in Step #635, it is judged in Step #651 whether the clip switch 87 has been set to an ON state. If the clip switch 87 is ON (YES in Step #651), the central processor 22 waits until an area to be cropped is specified by operating the data input device 19 or else (Step #653). When a cropping area has been specified (YES in Step #653), that area is cropped by the presentation controller 12 using an image processing technique for on-screen display (Step #655). In Step #657 the display region 77 of the display section 7 indicates which portion of the frame has been cropped by enclosing the cropped area with border lines 771 as shown in FIG. 2, for example (Step #657). The image cropping process loops around Steps #653, #655, #657 and #659 until the clip switch 87 becomes OFF. When the clip switch 87 becomes OFF (YES in Step #659), cropping area data is stored in the internal memory of the information reader/writer 101 or on the magnetic track 41 on the film 4 (Step #611).

On the other hand, if the clip switch 87 is OFF in Step #651, it is judged in Step #661 whether the color adjustment switch 82 has been set to an ON state. If the color adjustment switch 82 is ON (YES in Step #661), red, green and blue color levels are adjusted (Step #663). The color adjustment process of Steps #663 and #665 is cycled until the clip switch 87 becomes OFF. When the clip switch 87 becomes OFF (YES in Step #665), color adjustment data is stored in the internal memory of the information reader/writer 101 or on the magnetic track 41 on the film 4 (Step #611).

Further, if the color adjustment switch 82 is OFF in Step #661, it is judged in Step #667 whether the multi-frame display switch 97 has been set to an ON state. If the multi-frame display switch 97 is OFF (NO in Step #667), the flow returns to Step #611.

On the other hand, if the multi-frame display switch 97 is ON (YES in Step #667), the presentation controller 12 switches from the image memory 13 to the image memory 14 for multi-frame display (Step #669) and multi-frame images read from the image memory 14 are displayed on the TV monitor 2 (Step #671). In Step #673 it is judged whether the multi-frame display switch 97 has been set to an ON state again. If the multi-frame display switch 97 has been made ON again (YES in Step #673), the presentation controller 12 switches from the image memory 14 to the image memory 13 for single-frame display (Step #669) and a single-frame image read from the image memory 13 is displayed on the TV monitor 2 (Step #677). Then, the flow returns to Step #611.

If the multi-frame display switch 97 is OFF in Step #673, it is judged in Step #679 whether any frame number has been entered via the data input device 19. If no frame number has been entered (NO in Step #679), the flow returns to Step #673, from where a looping process including Steps #673 and #679 is cycled until the multi-frame display switch 97 is made ON again or a frame number is entered.

When a frame number is entered in Step #679, the frame number is stored in the internal memory of the central processor 22 (Step #681) and indicated in the display region 74 of the display section 7 (Step #683), and a film feeding amount K to bring the specified frame to the image sensing position is calculated (Step #685). Then, the film transport 102 is set to transport the film 4 in order to bring the specified frame to the image sensing position (Step #687). While the film 4 is being transported, the actual film feeding amount is measured based on the number of rotations of the drive motor of the film transport 102, for example (Step #689).

In Step #691 it is judged whether the actual film feeding amount has reached the required film feeding amount K. When the actual film feeding amount has reached the required film feeding amount K (YES in Step #691), the film transport 102 is stopped (Step #693) and the presentation controller 12 switches from the image memory 14 to the image memory 13 (Step #695), Then, the flow returns to Step #519 of FIG. 19A.

Figure 22:
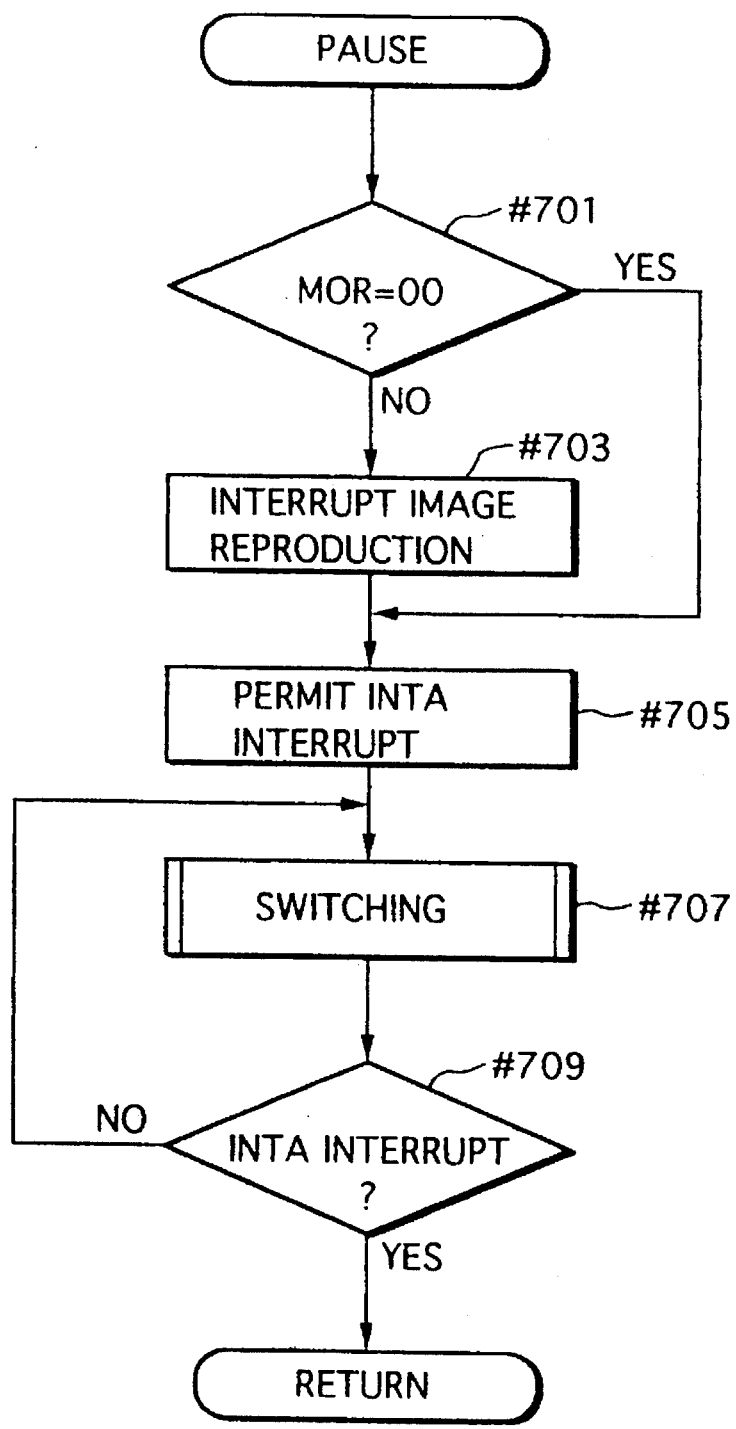
FIG. 22 is a flowchart showing a pause subroutine.

Referring now to the flowchart of FIG. 22, the pause subroutine of Step #311 shown in FIG. 15 is described below. First, it is judged in Step #701 whether the register MOR is set to "00". If the register MOR is set to other than "00" (NO in Step #701), presentation of the currently reproduced image is interrupted (Step #703). If the register MOR is set to "00", that is, the random operating mode is selected (YES in Step #701). Step #703 is skipped and the INTA interrupt is permitted (Step #705). Next, a switching subroutine is executed in Step #707. Description of the switching subroutine is omitted because it is basically the same as the reproduction status switching subroutine shown in FIGS. 21A through 21D, the only difference being that the former does not include a step corresponding to Step #601 of FIG. 21A. At this time, a looping process including Steps #707 and #709 is cycled until the INTA interrupt is requested. When the INTA interrupt is requested (YES in Step #709), the flow returns to the INTA interrupt subroutine of FIG. 15.

Figure 23:
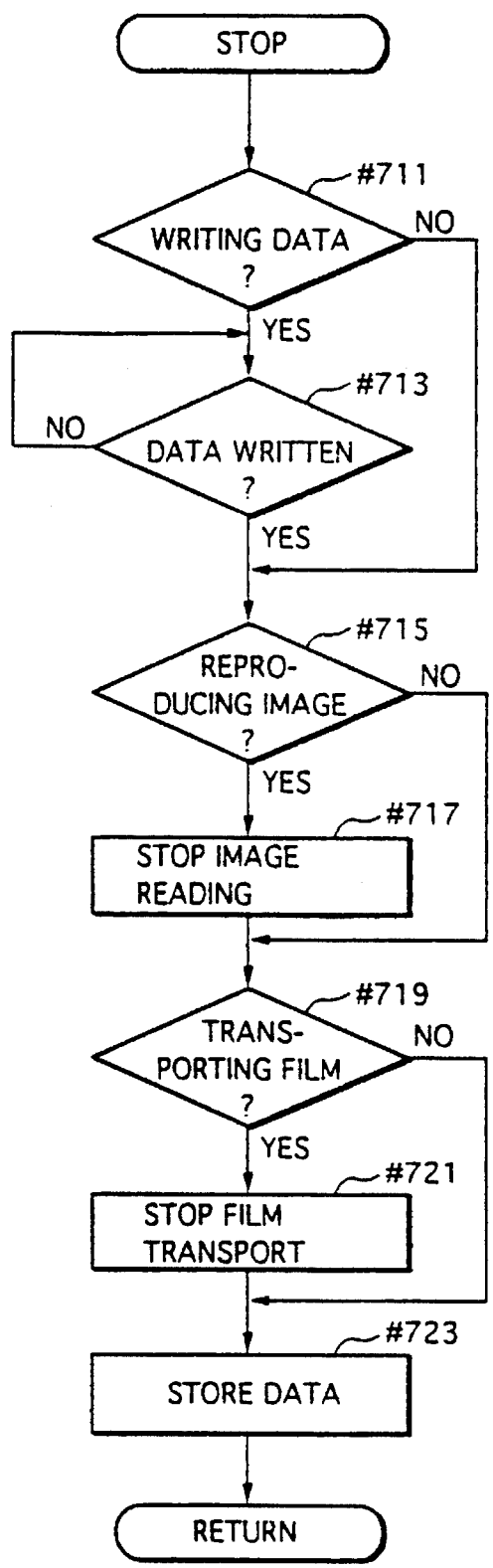
FIG. 23 is a flowchart showing a stop subroutine.

Referring next to the flowchart to FIG. 23, the stop subroutine of Step #315 shown in FIG. 15 is described.

First, it is judged in Step #711 whether any data is being written into the internal memory of the information reader/writer 101 and on the magnetic track 41 on the film 4. If the judgment result is in the affirmative (YES in Step #711), the central processor 22 waits until the data writing process is completed (Step #713). When it has been completed (YES in Step #713), the flow proceeds to Step #715. If no data is being written in Step #711, the flow skips Step #713 and proceeds to Step #715.

In Step #715 it is judged whether an image reproducing operation is currently in progress. If the judgment result is in the affirmative (YES in Step #715), image reading from the image memory 13 is interrupted (Step #717). On the other hand, if no image is being reproduced in Step #715, the flow skips Step #717 and proceeds to Step #719.

In Step #719 it judged whether the film transport 102 is currently transporting the film 4. If the film 4 is being transported (YES in Step #719), the flow proceeds to Step #721, where the film transport 102 is stopped. If the film 4 is not being transported (NO in Step #719), the flow skips Step #721 and proceeds to Step #723. In Step #723 data such as presentations and the frame number of the last reproduced frame is stored in the internal memory of the information reader/writer 101 or on the magnetic track 41 on the film 4. Using this data, presentation of the film 4 starts from the last reproduced frame next time.

Figure 19A:
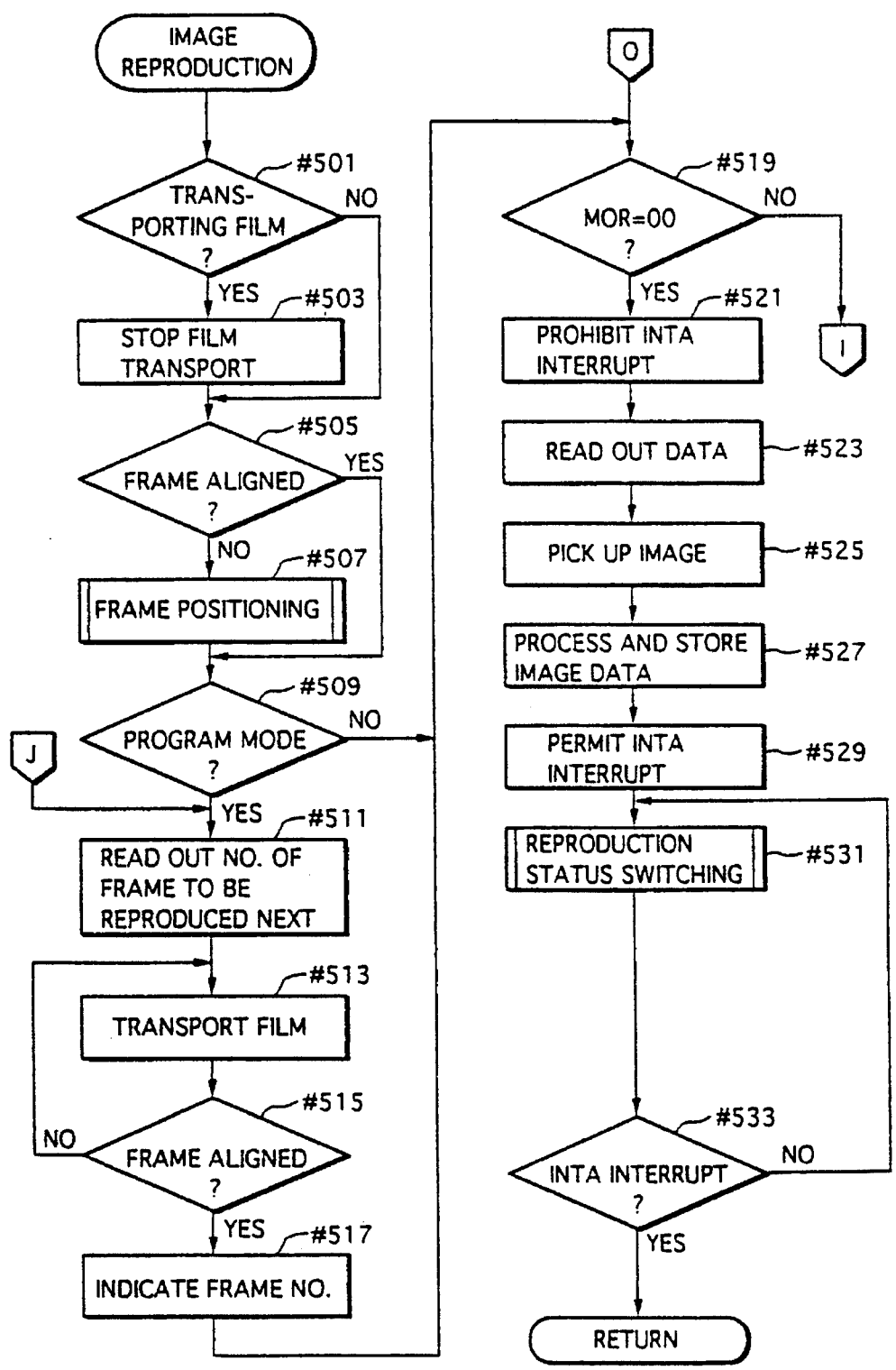
FIGS. 19A and 19B are flowcharts combinedly showing an image reproduction subroutine.
Figure 19B:
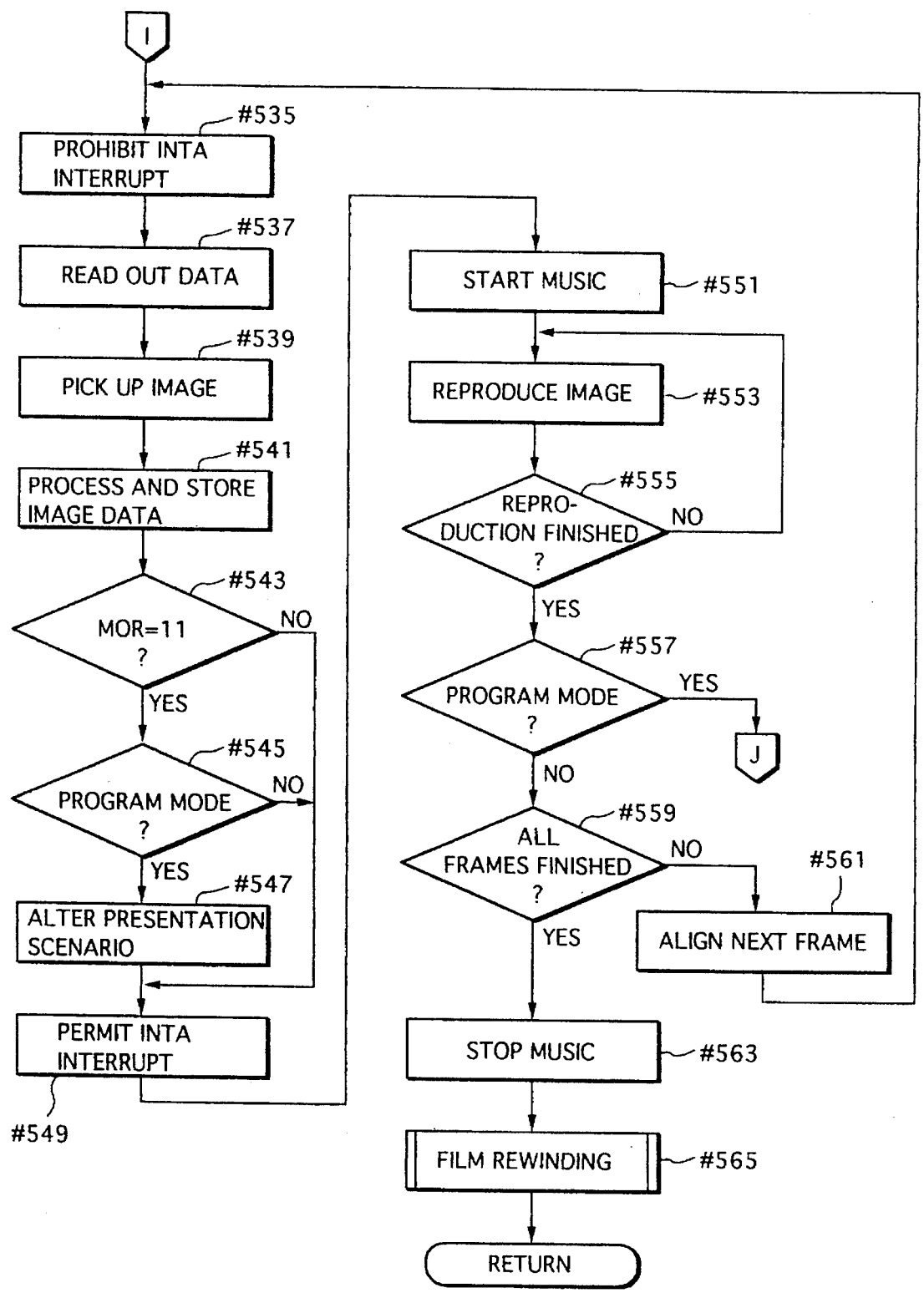

Although data is read from the magnetic track 41 on the film 4 (Steps #523 and #537) after prohibiting the INTA interrupt (Steps #521 and #535) in the image reproduction subroutine of FIGS. 19A and 19B, priority may be given to the INTA interrupt. To achieve this, Steps #521 and #535 should be replaced with operations shown in FIG. 24 immediately followed by the INTA interrupt subroutine of FIG. 15. In this variation, the INTA interrupt can be made while the image reproduction subroutine is being executed.

More specifically, it is judged in Step #731 whether any image is being picked up. If the judgment result is in the affirmative (YES in Step #731), the image pickup operation is interrupted (Step #733) and the contents of the image memory 13 are cleared (Step #735). Next, it is judged in Step #137 whether any data is being read from the magnetic track 41 on the film 4. If the judgment result is in the affirmative (YES in Step #733), the image reading operation is interrupted (Step #739) and the read data is cleared (Step #741).

Figure 24:
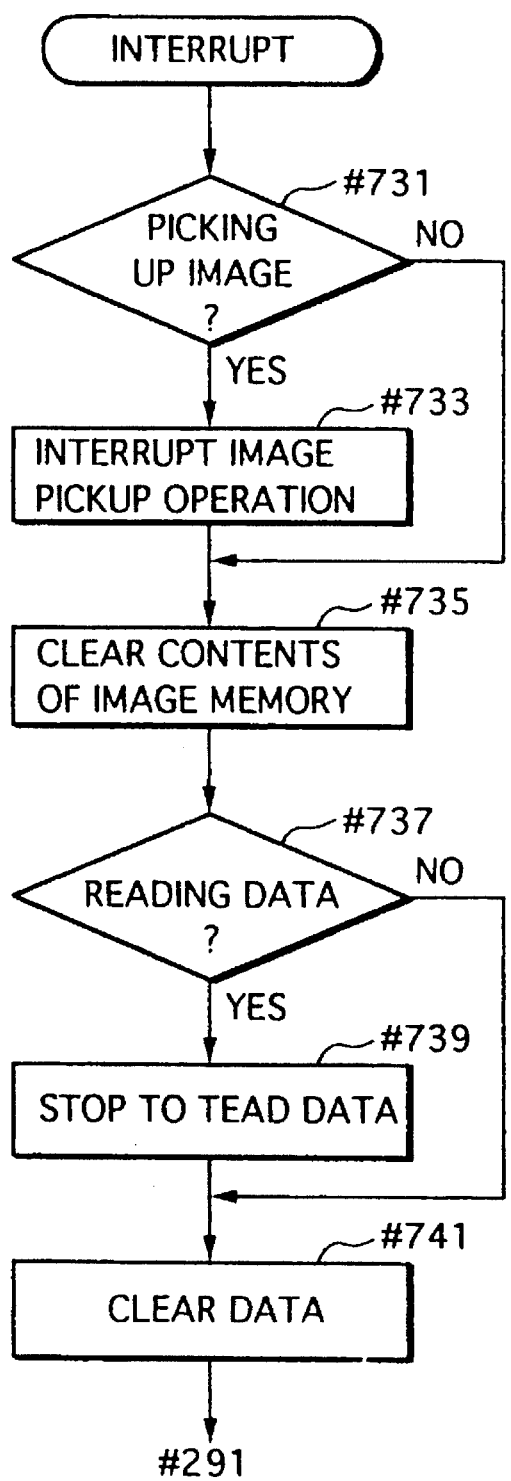
FIG. 24 is a flowchart showing an interrupt permission subroutine for permitting the INTA subroutine even when the image reproduction subroutine is being executed.

By using the subroutine of FIG. 24, it is possible to give priority to the INTA interrupt in the image reproduction subroutine of FIGS. 19A and 19B.

Figure 17A:
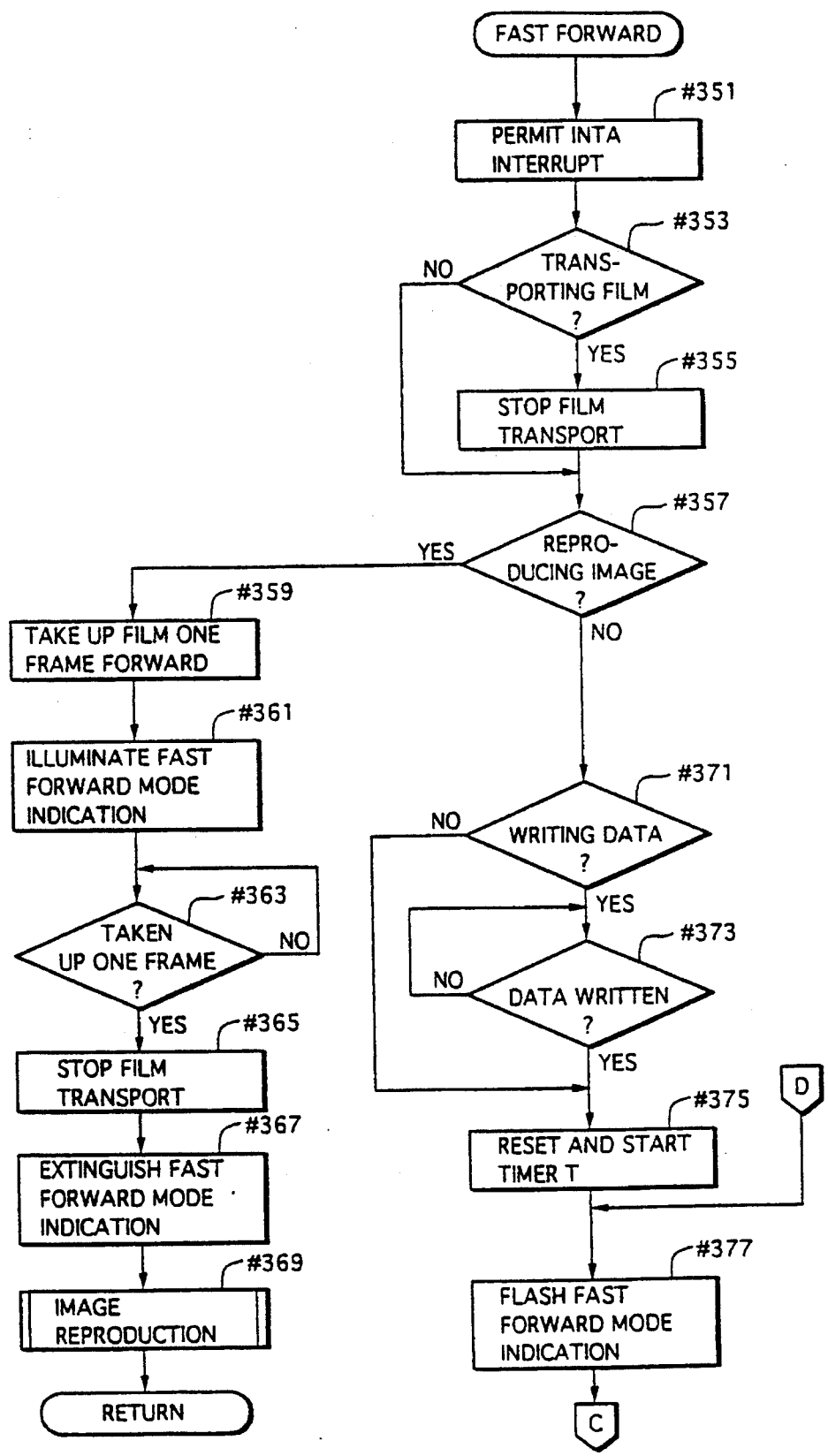
FIGS. 17A and 17B are flowcharts combinedly showing a fast forward subroutine.
Figure 17B:
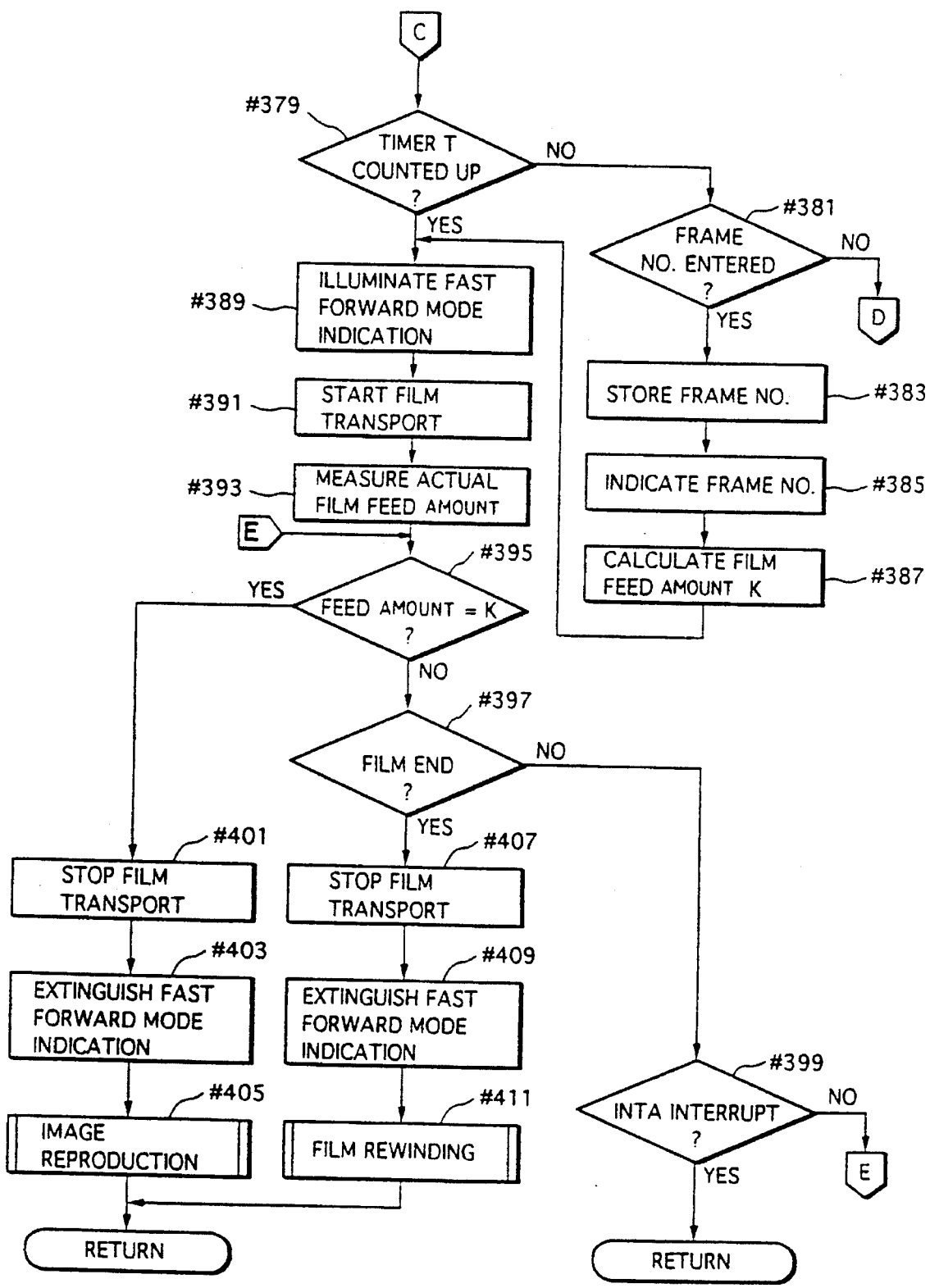
Figure 18A:
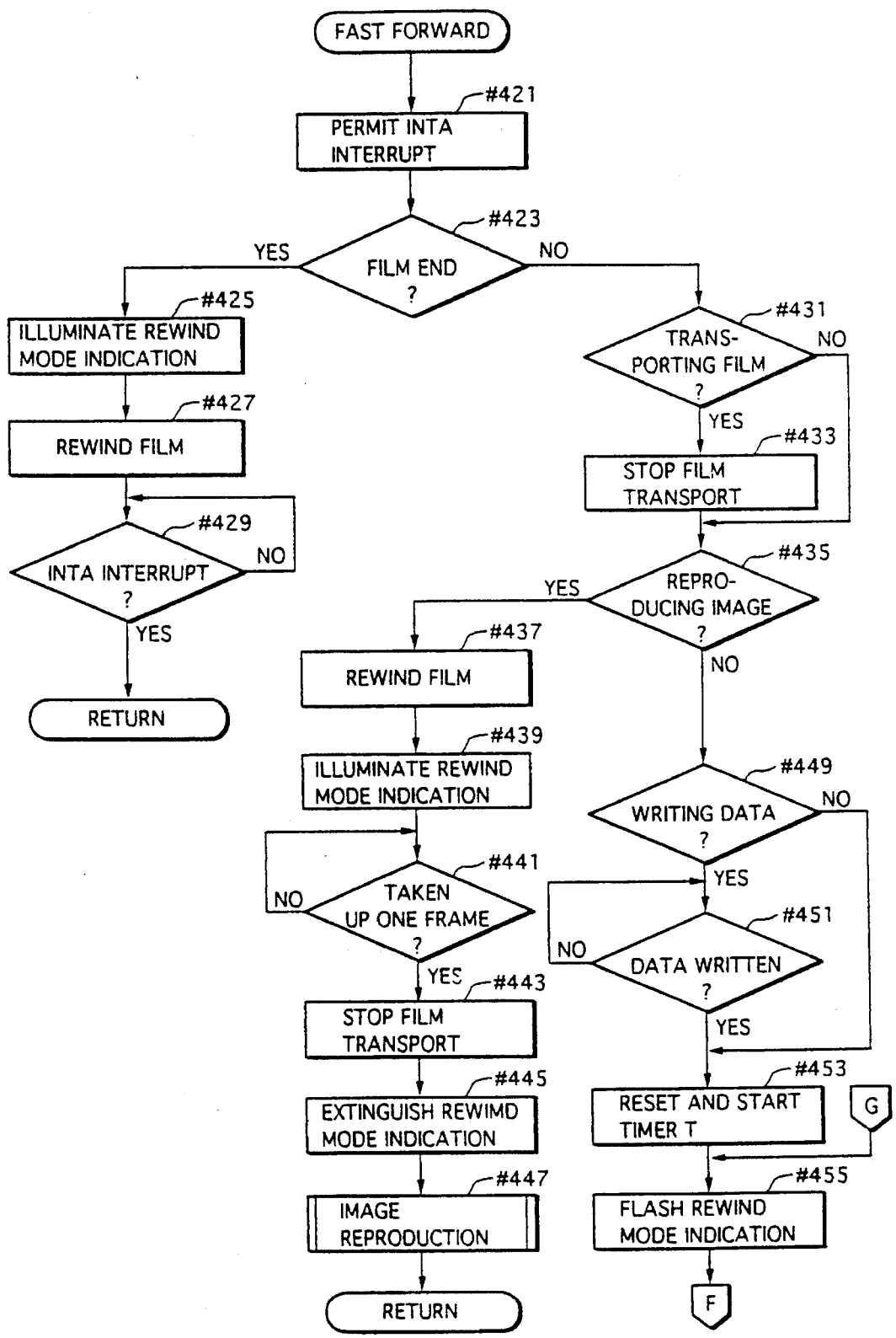
FIGS. 18A and 18B are flowcharts combinedly showing a film rewinding subroutine.
Figure 18B:
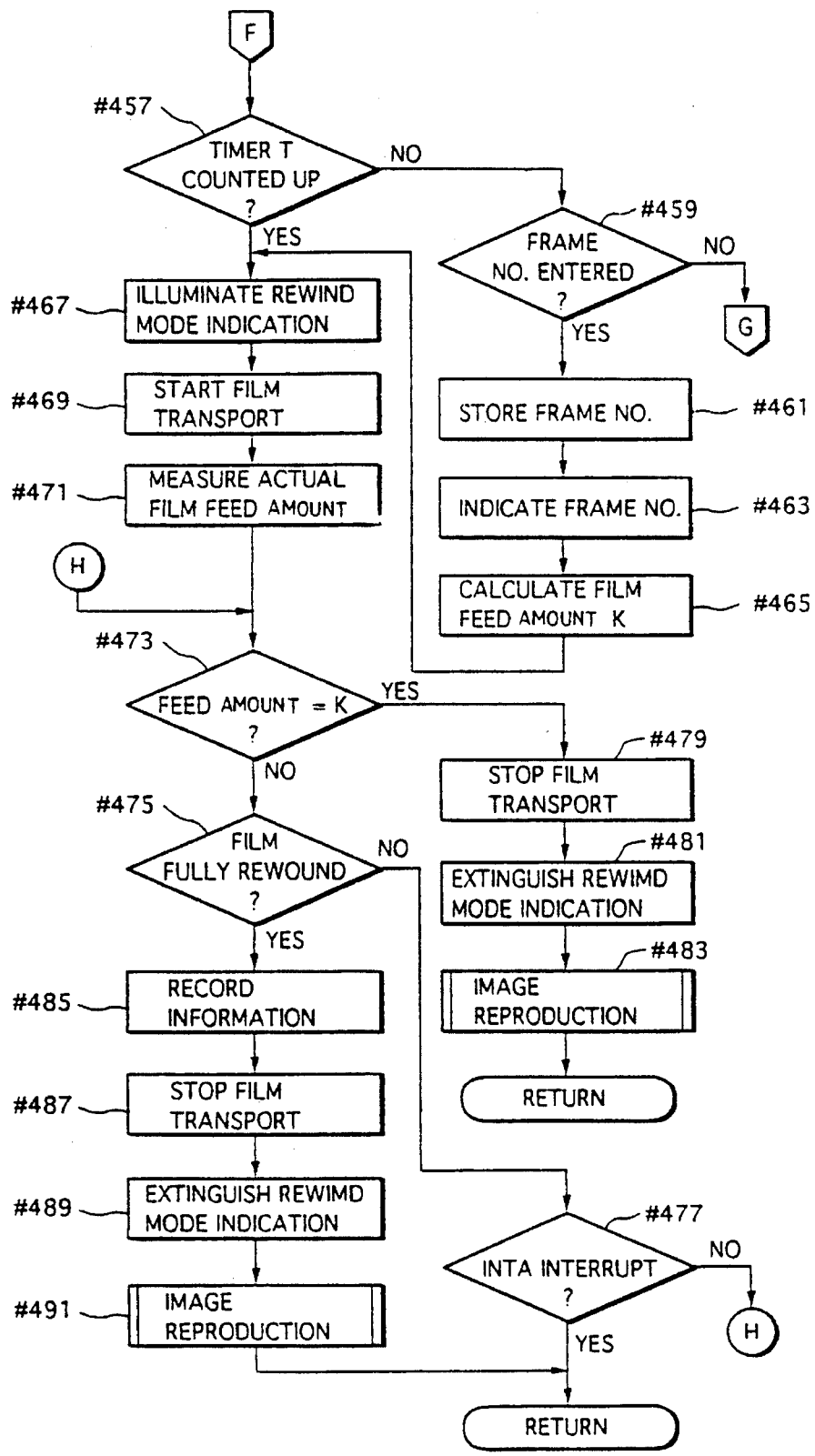

When the rewind switch 88 or fast forward switch 92 is pressed while the information reader/writer 101 is writing any data on the magnetic track 41 on the film 4, the film 4 is not transported in the rewind or fast forward mode until the data writing process is completed as shown by Steps #371 and #373 of FIG. 17A or Steps #449 and #451 of FIG. 18A. This ensures appropriate data writing operations and prevents data reading problems when reproducing images at a later time.

The magnetic head 101a writes data on the magnetic track 41 on the film 4 while the film 4 is being rewound in the foregoing embodiment. Instead, data may be written without moving the film 4 any direction but moving the magnetic head 101a in the forward direction with unillustrated moving means.

Furthermore, although images are recorded on a photographic film in the foregoing embodiment, the type of the image recording medium is not limited thereto. For example, a magnetic disk, magnetic tape, optical disk or compact disk may be used to record image data converted into digital signals.

As this invention may be embodied in several forms without departing from the spirit of essential characteristics thereof, the foregoing embodiments are therefore illustrative and not restrictive, since the scope of the invention is defined by the appending claims rather than by the description preceding them, and all changes that fall within meets and bounds of the claims, or equivalence of such meets and bounds are therefore intended to be embraced by the claims.

What is claimed is:

1. An image reproducing apparatus for reproducing an image recorded on successive frames of a film having a storage medium which information for each frame is readable from or writable on, the reproducing apparatus comprising:

a reproduction device for reproducing the image;

a transfer device for reading or writing frame information from or on the storage medium in a first relative movement to the film;

a drive device for rendering the first relative movement of the transfer device to the film, and for rendering a second relative movement, and for advancing the film to a frame next to the frame on which the information is read or written;

a director for directing the second relative movement;

a discriminator which discriminates whether the transfer device is in operation or not; and a controller responsive to the discriminator for keeping the drive device from rendering the second relative movement when the transfer device is discriminated to be in operation.

2. An image reproducing apparatus according to claim 1 wherein the second relative movement is a manner of transporting the film faster than a first relative speed of the first relative movement.

3. An image reproducing apparatus according to claim 1 wherein the second relative movement is a manner of transporting the film in a direction opposite to a first relative direction of the first relative movement.

4. An image reproducing apparatus according to claim 1 further comprising a reproduction controller responsive to the discriminator for controlling the reproduction device to suspend the image reproduction when the second relative movement is directed.

5. An image reproducing apparatus according to claim 1 wherein:

the transfer device includes a device for performing the frame information reading and writing, said device being held at a fixed position; and the drive device includes a transport device for transporting the film.

6. An image reproducing apparatus for reproducing an image recorded on successive frames of a film, the image reproducing apparatus comprising:

a sensing device for sensing the image for reproducing;

a first transport device for transporting the film at a first speed in a first direction for sensing of the sensing device;

a second transport device for transporting the film in a manner different from the first transport device;

a discriminator for discriminating whether the first transport device is in operation or not; and a controller responsive to the discriminator for keeping the second transport device from being placed in operation when the first transport device is discriminated to be in operation.

7. An image reproducing apparatus according to claim 6 wherein the second transport device includes a device for transporting the film faster than the first speed.

8. An image reproducing apparatus according to claim 6 wherein the second transport device includes a device for transporting the film in a direction opposite to the first direction.

9. An image reproducing apparatus according to claim 6 further comprising a reproduction controller responsive to the discriminator for controlling the sensing device to suspend image reproduction when the second transport device is placed in operation.

10. An image reproducing apparatus for reproducing an image recorded on successive frames of a film having a storage medium which information for each frame is readable from or writable on, the image reproducing apparatus comprising:

a reproduction device for reproducing the image;

a transfer device for reading or writing frame information from or on the storage medium;

a drive device for carrying out an operation independent of the information reading and writing;

a discriminator for discriminating whether the transfer device is in operation when the drive device is directed to operate; and a controller responsive to the discriminator for keeping the drive device from entering into operation when the transfer device is discriminated to be in operation.

11. An image reproducing apparatus according to claim 10 wherein the operation by the drive device is a movement of the film being fed out at a high speed.

12. An image reproducing apparatus according to claim 10 wherein the operation by the drive device is a movement of the film being rewound.

13. An image reproducing apparatus according to claim 10 wherein the operation by the drive device is a movement of the film from a predetermined set position.

14. An image reproducing apparatus according to claim 10 further comprising a reproduction controller responsive to the discriminator for controlling the reproduction device to suspend image reproduction when the film enters into the operation by the drive device.

15. An image reproducing apparatus for reproducing an image recorded on successive frames of a film having a storage medium which information for each frame is readable from or writable on, the reproducing apparatus comprising:

a transfer device for picking up the image from the film, and reading or on the storage medium in a first relative movement to the film;

a drive device for rendering relative movements of the transfer device to the film, the drive device being capable of rendering the first relative movement and a second relative movement;

a director for directing the second relative movement; and a controller for keeping the drive device from rendering the second relative movement when the transfer device is in operation.

* * * * *